(12) United States Patent
Hiraike

(10) Patent No.: US 11,210,038 B2
(45) Date of Patent: Dec. 28, 2021

(54) INFORMATION PROCESSING SYSTEM AND MOBILE TERMINAL FOR PROVIDING A SERVICE TO BACKUP DATA

(71) Applicant: CANON KABUSHIKI KAISHA, Tokyo (JP)

(72) Inventor: Kou Hiraike, Nagareyama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/838,951

(22) Filed: Apr. 2, 2020

(65) Prior Publication Data
US 2020/0341695 A1 Oct. 29, 2020

(30) Foreign Application Priority Data
Apr. 23, 2019 (JP) .............................. JP2019-082334

(51) Int. Cl.
*G06F 3/12* (2006.01)
*H04N 1/00* (2006.01)

(52) U.S. Cl.
CPC ............ *G06F 3/121* (2013.01); *G06F 3/1231* (2013.01); *G06F 3/1234* (2013.01); *H04N 1/00315* (2013.01); *H04N 1/00328* (2013.01); *H04N 1/00973* (2013.01)

(58) Field of Classification Search
CPC ...... G06F 3/121; G06F 3/1231; G06F 3/1234; G06F 3/1287; G06F 3/1288; G06F 3/1286; G06F 3/1292; H04N 1/00315; H04N 1/00973; H04N 1/00328
See application file for complete search history.

(56) References Cited

U.S. PATENT DOCUMENTS

| 8,639,972 | B2* | 1/2014 | Matsushita | ........ H04N 1/00973 714/13 |
| 2008/0114876 | A1* | 5/2008 | Nigorikawa | ....... H04N 1/00973 709/224 |
| 2009/0081998 | A1* | 3/2009 | Ueno | ..................... G06F 21/10 455/414.3 |
| 2009/0231612 | A1* | 9/2009 | Matsushita | ........ H04N 1/00973 358/1.15 |

(Continued)

FOREIGN PATENT DOCUMENTS

| JP | 2013-131168 A | 7/2013 |
| JP | 2016-105646 A | 6/2016 |

(Continued)

*Primary Examiner* — Juan M Guillermety
(74) *Attorney, Agent, or Firm* — Canon U.S.A., Inc. IP Division

(57) ABSTRACT

An information processing system includes a first information processing apparatus, a second information processing apparatus, and a server configured to provide import data based on backup data of the first information processing apparatus to the second information processing apparatus. The first information processing apparatus transmits identification information regarding the backup data to a mobile terminal through wireless communication. The second information processing apparatus receives the identification information from the mobile terminal through the wireless communication, acquires, based on the identification information, the import data from the server via a network, and executes an import process based on the import data.

22 Claims, 19 Drawing Sheets

(56) References Cited

U.S. PATENT DOCUMENTS

| | | | | |
|---|---|---|---|---|
| 2009/0249011 A1* | 10/2009 | Ohishi | ............... | G06F 11/1456 |
| | | | | 711/162 |
| 2015/0002870 A1* | 1/2015 | Burke, Jr. | ............. | G06F 3/1234 |
| | | | | 358/1.13 |
| 2016/0085489 A1* | 3/2016 | Hansen | ................ | G06F 3/1292 |
| | | | | 358/1.15 |
| 2016/0274828 A1* | 9/2016 | Oshima | ................ | G06F 3/1292 |
| 2018/0349065 A1* | 12/2018 | Hayashi | .................. | G06F 3/123 |
| 2019/0034126 A1* | 1/2019 | Iwashita | ............... | G06F 3/1292 |
| 2019/0320087 A1* | 10/2019 | Shimotsu | ............. | G06F 3/1285 |

FOREIGN PATENT DOCUMENTS

| | | |
|---|---|---|
| JP | 2018-84944 A | 5/2018 |
| JP | 2019-109848 A | 7/2019 |

\* cited by examiner

FIG.2
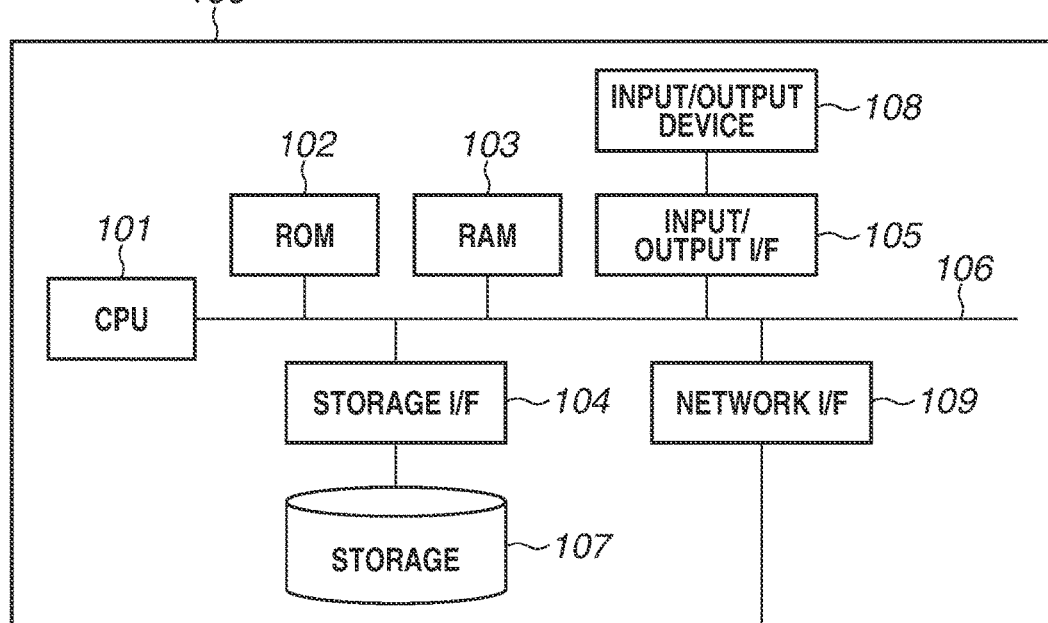
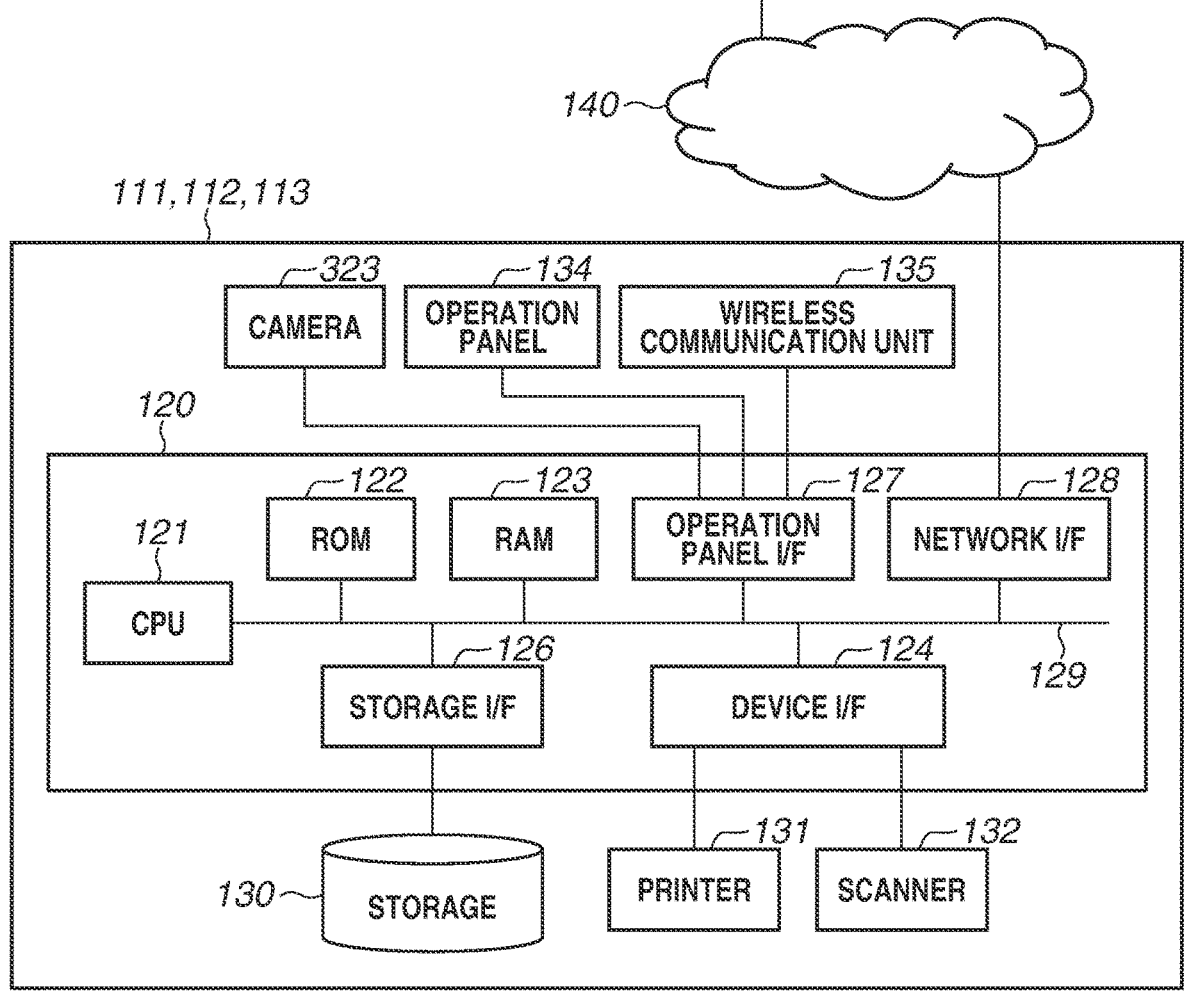

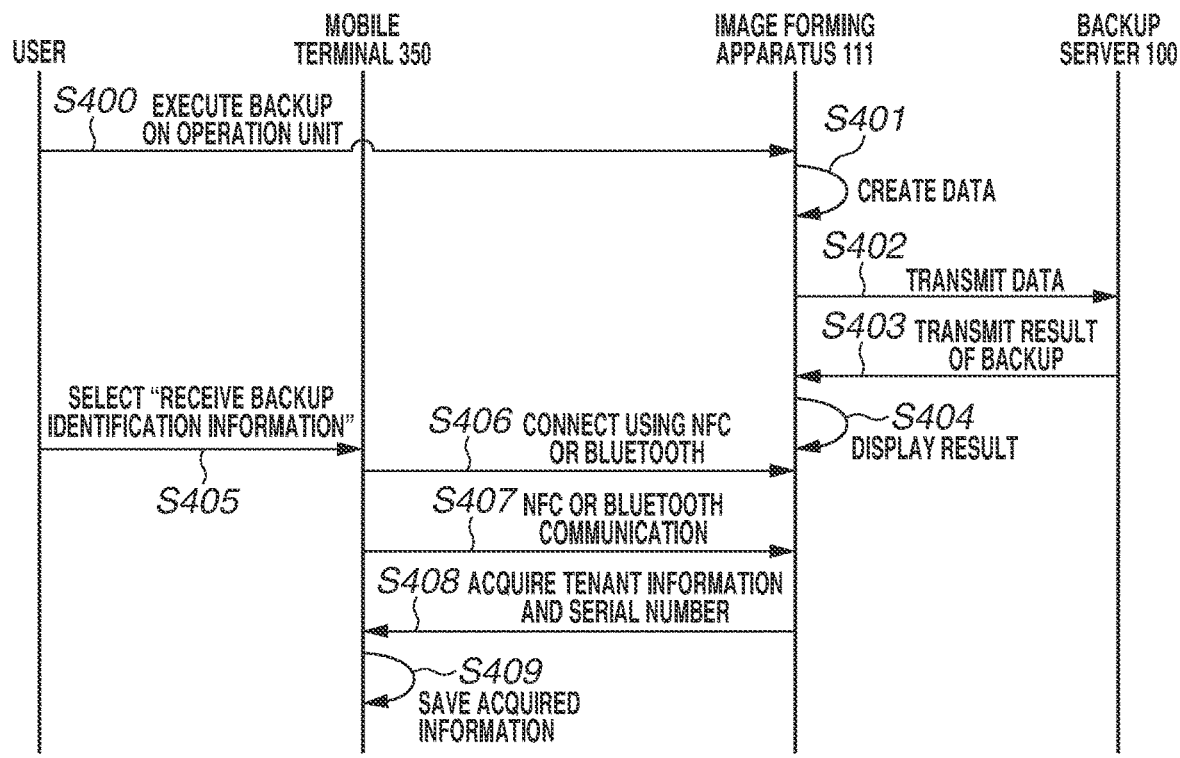
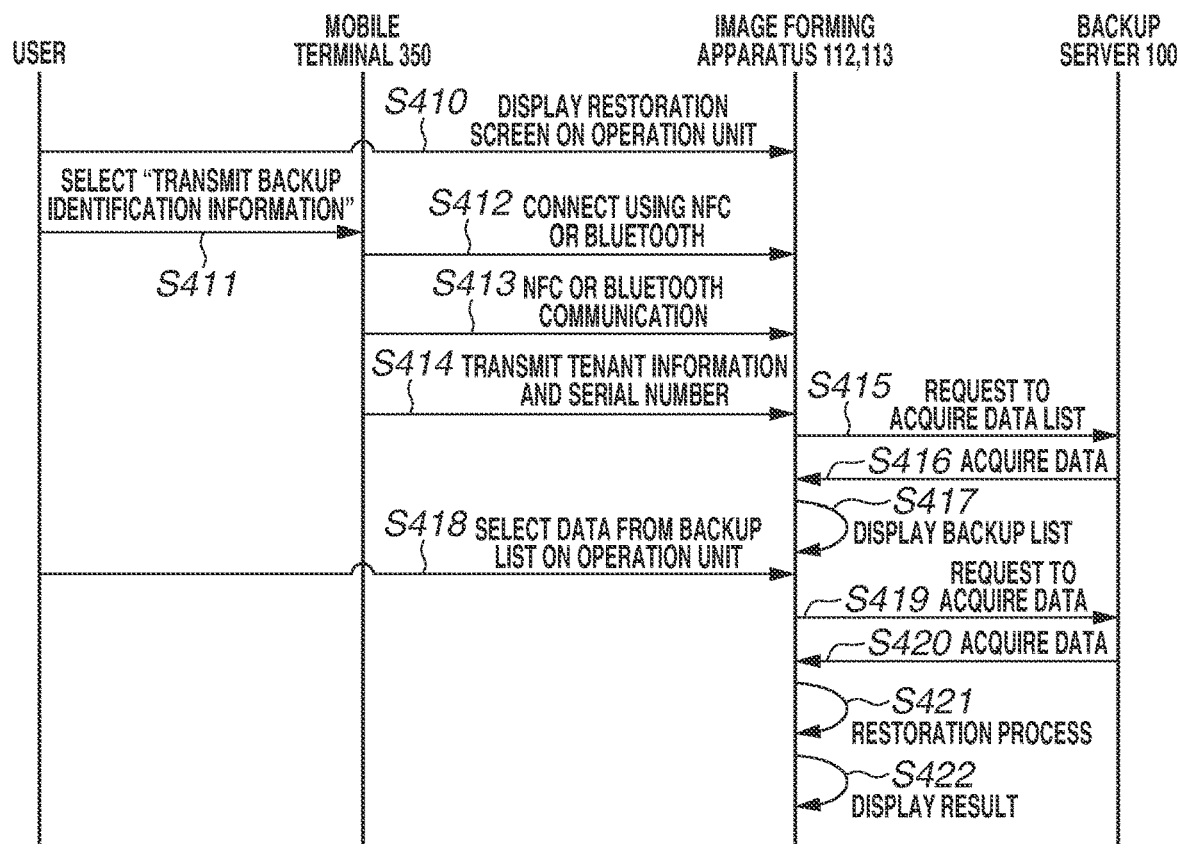

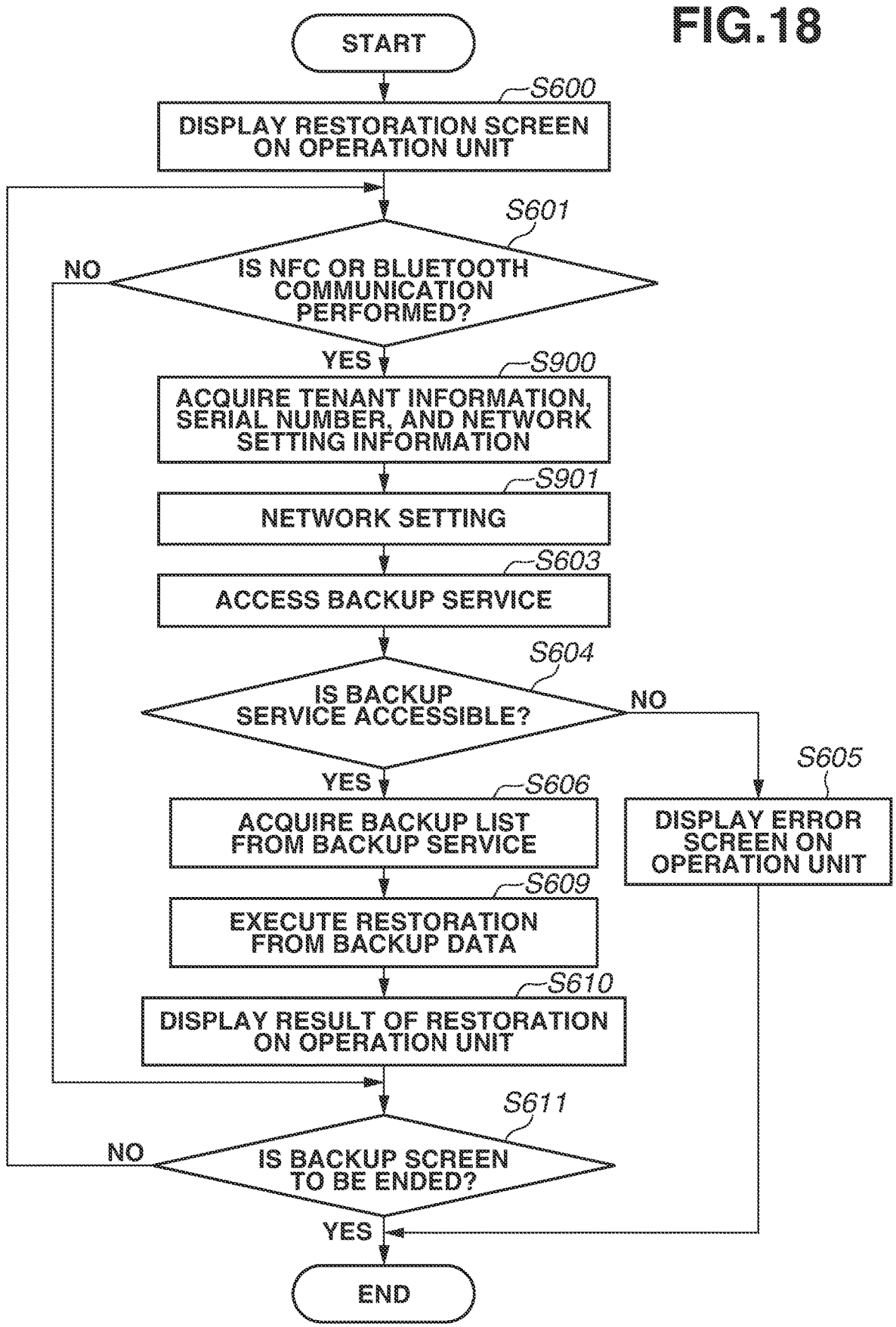

INFORMATION PROCESSING SYSTEM AND MOBILE TERMINAL FOR PROVIDING A SERVICE TO BACKUP DATA

BACKGROUND

Field

The present disclosure relates to an information processing system for providing a service (migration service) that backs up data of an information processing apparatus in an external apparatus such as a cloud server and imports this backup data into another information processing apparatus. The information processing apparatus is used as a personal computer, a printer, a facsimile machine, a scanner, and a multifunction peripheral (image forming apparatus) having the functions of these apparatuses.

Description of the Related Art

A technique for importing backup data of a previously used multifunction peripheral (MFP) into a new MFP to smoothly switch MFPs is known. Japanese Patent Application Laid-Open No. 2013-131168 discusses a technique for registering backup data of a previously used MFP to a server and downloading the backup data to a new MFP, using tenant information and an identifier.

SUMMARY

It has now been determined that for tenant information and an identifier, long character strings tend to be used in terms of security and distinguishability. Thus, it is troublesome to manually input the tenant information and the identifier using a keyboard. Particularly in a case where a single piece of backup data is imported into a plurality of multifunction peripherals, it is necessary to manually input tenant information and an identifier for each apparatus. This requires considerable man-hours.

Accordingly, an aspect of the present disclosure features an information processing system excellent in operability of importing backup data into another information processing apparatus, and in particular, features an information processing system capable of preventing an increase in man-hours to make an import instruction.

According to another aspect of the present disclosure, an information processing system includes a first information processing apparatus, a second information processing apparatus, and a server configured to provide import data based on backup data of the first information processing apparatus to the second information processing apparatus, wherein the first information processing apparatus transmits identification information regarding the backup data to a mobile terminal through wireless communication, wherein the second information processing apparatus receives the identification information from the mobile terminal through the wireless communication, wherein the second information processing apparatus acquires, based on the identification information, the import data from the server via a network, and wherein the second information processing apparatus executes an import process based on the import data.

Further features of the present disclosure will become apparent from the following description of exemplary embodiments with reference to the attached drawings.

BRIEF DESCRIPTION OF THE DRAWINGS

FIG. 2 is a block diagram illustrating a hardware configuration of the image forming apparatus and a hardware configuration of a server.

FIG. 8A is a sequence diagram illustrating a sequence of backup. FIG. 8B is a sequence diagram illustrating a sequence of restoration of backup.

FIG. 18 is a flowchart illustrating a restoration process performed by an image forming apparatus.

DESCRIPTION OF THE EMBODIMENTS

With reference to the drawings, exemplary embodiments for carrying out the present disclosure will be described below. Components in the description, however, are merely examples, and is not intended to limit the scope of the present disclosure. Components may be replaced, added, and/or deleted as long as an aspect of the present disclosure can be achieved.

<System>

Figure 1:
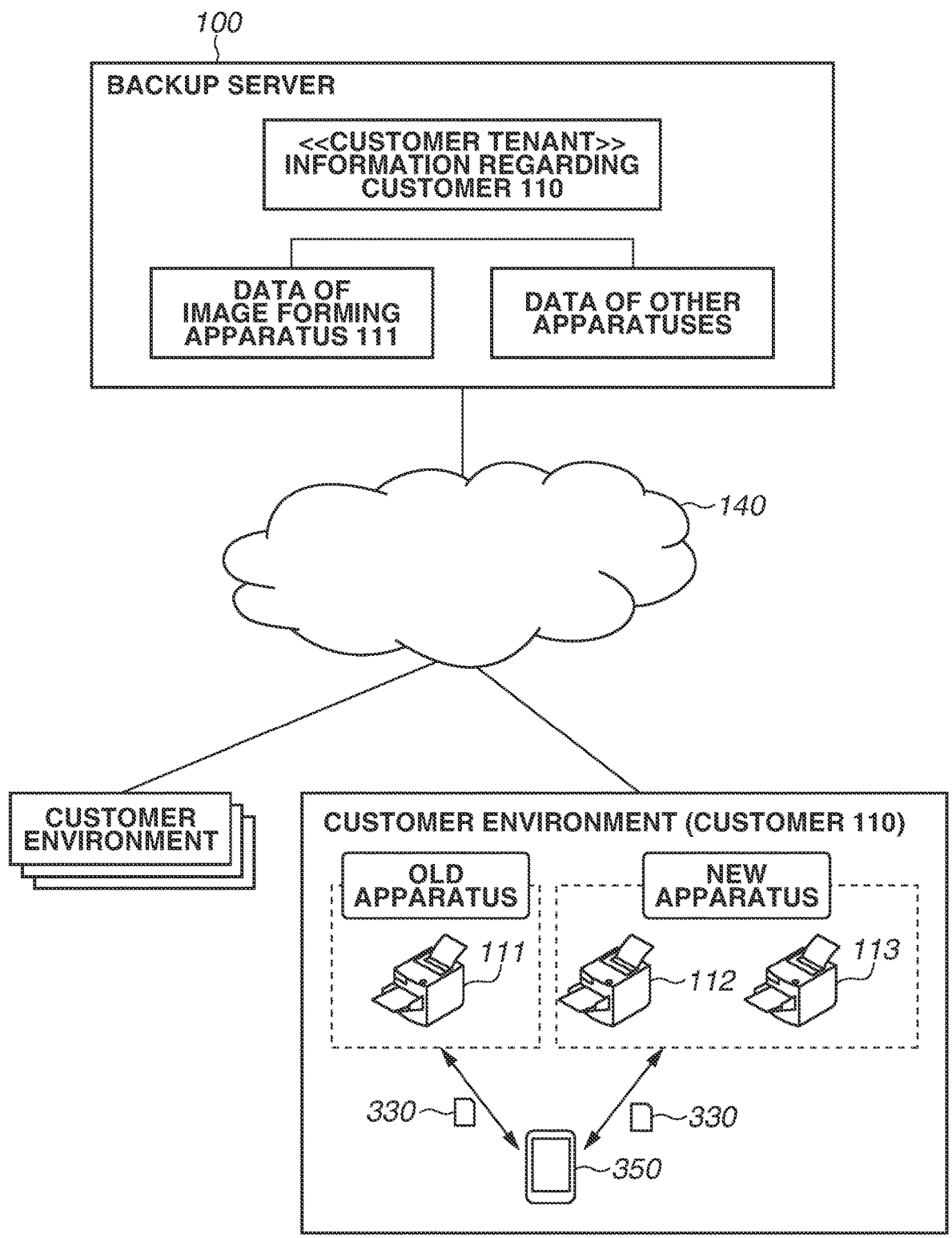
FIG. 1 is a block diagram illustrating a system configuration of an image forming apparatus.

FIG. 1 is a block diagram illustrating a system configuration according to a first exemplary embodiment. As illustrated in FIG. 1, this system (information processing system) includes a backup server 100 and a customer 110.

The backup server 100 is a service on a cloud system provided by one or more information processing apparatuses and functions as a device management system. The device management system manages information regarding a customer to which a backup service is provided, device information such as a device identification (ID), a model, and authentication information regarding one or more image forming apparatuses owned by the customer, and backup data regarding each of the image forming apparatuses. In other words, the backup server 100 can manage a plurality of pieces of backup data.

The backup server 100 saves backup data on a storage service with which the backup server 100 can cooperate. The backup data includes setting information regarding one or more image forming apparatuses owned by one or more customers to be management targets, and the setting values of applications. For example, the backup data may include setting information regarding printing, setting information regarding scanning, setting information regarding facsimile, setting information regarding power, setting information regarding a sheet, setting information regarding communication, setting information regarding display, and setting information regarding maintenance. The backup data may include setting information regarding a web browser, information regarding an address book, information regarding an application, information regarding security, information regarding a user, setting information regarding Bluetooth Low Energy (BLE), and setting information regarding near-field communication (NFC).

In a case where some kind of trouble occurs in the storage of any of the image forming apparatuses as the management targets, the backup server 100 receives a request transmitted from the image forming apparatus. Then, in response to the request, the backup server 100 distributes at least a part of the backed-up data to the image forming apparatus, thereby providing a restoration function to the image forming apparatus. The backup server 100 can also provide a migration function or an import function for importing backup data into another image forming apparatus.

As illustrated in FIG. 1, the backup server 100 prepares a "customer tenant" area obtained by dividing a data storage area for each customer and manages backup data of an image forming apparatus (e.g., image forming apparatus 111) owned by the customer 110 in association with the image forming apparatus in this tenant.

The customer 110 is a customer who receives a backup service for image forming apparatuses owned by the customer. In the customer environment of the customer 110, one or more image forming apparatuses (multifunction peripherals (MFPs)) exist on a local area network (LAN). FIG. 1 illustrates an example in which the customer 110 owns image forming apparatuses 111, 112, and 113. The image forming apparatuses 111 to 113 can communicate with the backup server 100, using authentication information issued after the customer 110 makes a contract for the backup service. A mobile terminal 350 operated by a customer manager of the customer 110 exchanges information 330 that is identification information required to perform a migration process from an old apparatus to a new apparatus.

<Use Sequence>

As a use example of this system, a case will be described where data of the image forming apparatus 111 as an old apparatus is backed up and imported into the image forming apparatus 112 or 113 as a new apparatus. In the present exemplary embodiment, a serial number for identifying the old apparatus is input to the new apparatus via the mobile terminal 350. This can save the trouble for a user making a note of the serial number of the old apparatus. The old apparatus and the mobile terminal 350 exchange the serial number through wireless communication, and the new apparatus and the mobile terminal 350 exchange the serial number through wireless communication. This allows the user to omit the input of the serial number. FIG. 8A is a sequence diagram illustrating the sequence of backup. FIG. 8B is a sequence diagram illustrating the sequence of the restoration of backup.

Figure 4A:
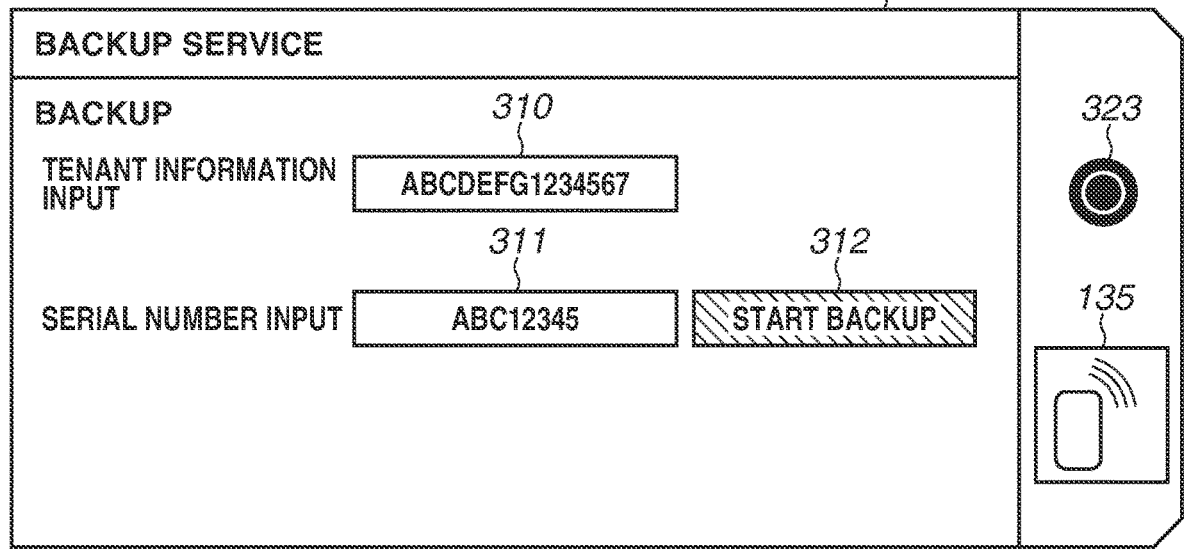
FIGS. 4A and 4B are diagrams each illustrating a backup screen.

To perform backup, in step S400, the user opens a backup screen 305 in FIG. 4A on an operation panel 134 of the image forming apparatus 111, inputs tenant information and a serial number to a "tenant information" field 310 and a "serial number" field 311, respectively, and then executes a backup process.

In step S401, the image forming apparatus 111 creates backup data. In step S402, the image forming apparatus 111 transmits the backup data to the backup server 100 (a backup service 200 provided by the backup server 100). In step S403, the backup server 100 transmits the result of the backup to the image forming apparatus 111. Then, in step S404, the image forming apparatus 111 displays the result of the backup on the operation panel 134. In step S405, the user starts a mobile application 360 in the mobile terminal 350 and presses a "receive backup identification information" button 391 in FIG. 7. Then, in step S406, the user connects a wireless communication unit 370 of the mobile terminal 350 to a wireless communication unit 135 of the image forming apparatus 111. In step S407, the mobile terminal 350 performs NFC or Bluetooth® communication with the image forming apparatus 111. In step S408, the mobile terminal 350 acquires the tenant information and the serial number input in step S400 from the image forming apparatus 111. In step S409, the mobile terminal 350 saves the acquired tenant information and serial number in storage 358 of the mobile terminal 350, and this flow is ended.

Figure 5A:
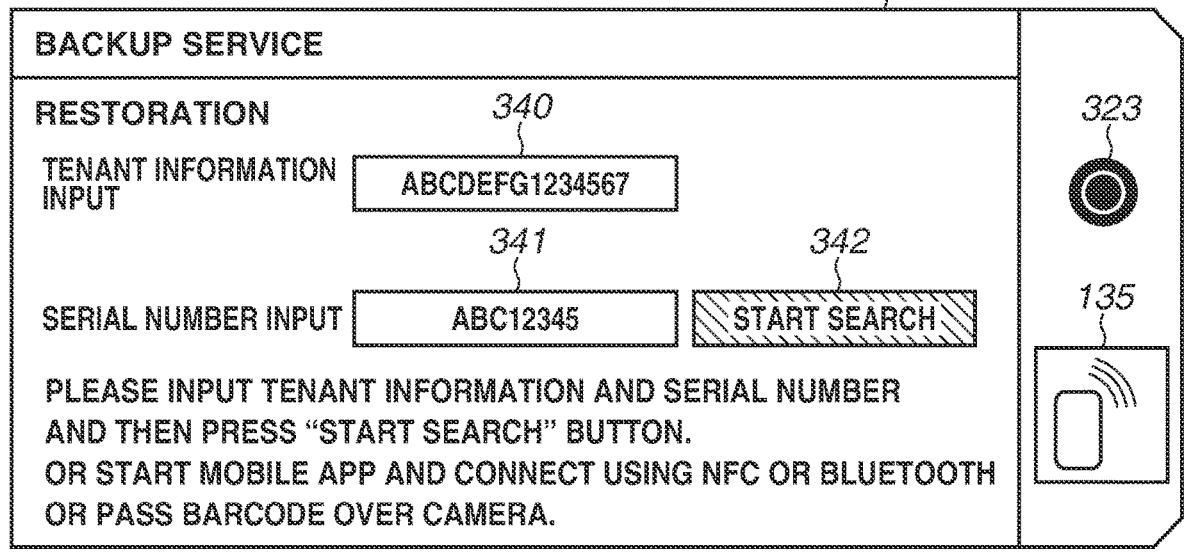
FIGS. 5A, 5B, and 5C are diagrams each illustrating a restoration screen.

To perform restoration (migration or import), in step S410, the user displays a restoration service screen 307 in FIG. 5A on an operation panel 134 of the image forming apparatus 112 or 113.

In step S411, the user starts the mobile application 360 in the mobile terminal 350, confirms tenant information and a serial number specified respectively in a "tenant information" field 392 and a "serial number" field 393, and then presses a "transmit backup identification information" button 394. Then, in step S412, the user connects the wireless communication unit 370 of the mobile terminal 350 to a wireless communication unit 135 of the image forming apparatus 112 or 113. In step S413, the mobile terminal 350 performs wireless communication using NFC or Bluetooth with the image forming apparatus 112 or 113. In step S414, the mobile terminal 350 transmits the tenant information and the serial number selected in step S411 to the image forming apparatus 112 or 113. At this time, the tenant information regarding the customer 110 and the serial number of the image forming apparatus 111 are transmitted.

Figure 5B:
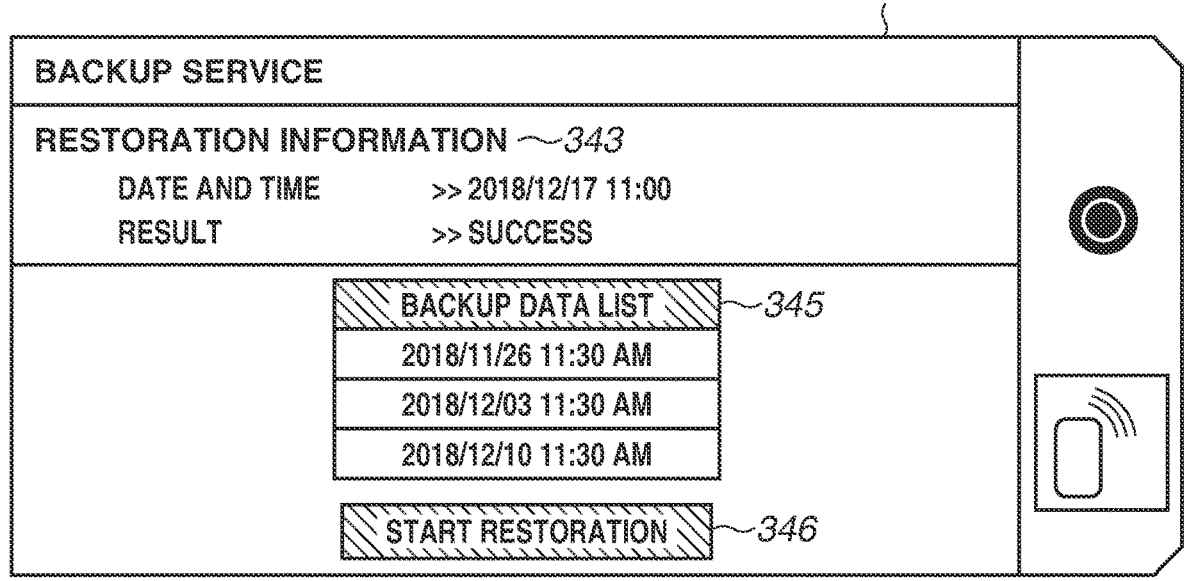

In step S415, the image forming apparatus 112 or 113 specifies the tenant information and the serial number received from the mobile terminal 350 and sends acquisition request of a list of backup data to the backup server 100. In step S416, the image forming apparatus 112 or 113 receives a list of backup data from the backup server 100. In step S417, the image forming apparatus 112 or 113 displays the list on the operation panel 134 of the image forming apparatus 112 or 113. FIG. 5B illustrates a screen 308 as the display of the result in step S417. At this time, as backup data of the image forming apparatus 111, a plurality of pieces of backup data having different backup timings is listed.

In step S418, the user selects data to be restored from the list displayed on the operation panel 134 of the image forming apparatus 112 or 113. In step S419, the image forming apparatus 112 or 113 specifies the backup data and sends acquisition request of the backup data to the backup server 100. In step S420, the image forming apparatus 112 or 113 acquires (downloads) the specified backup data (import data) from the backup server 100.

Figure 5C:
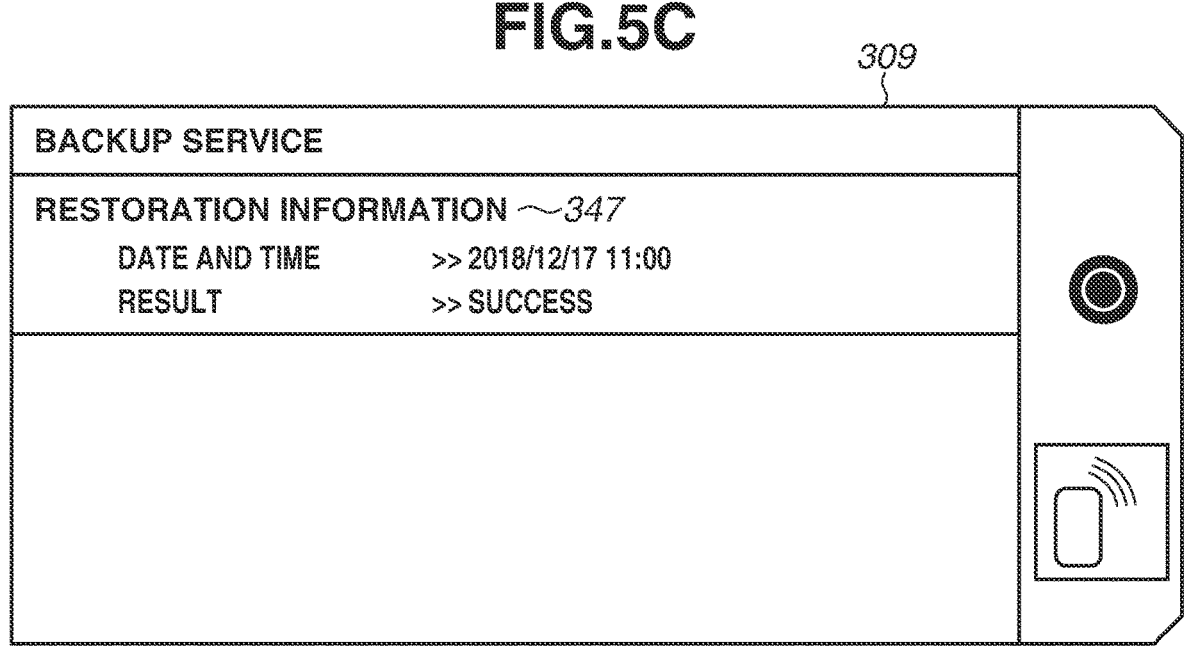

In step S421, the image forming apparatus 112 or 113 performs a restoration process (import process) based on the acquired backup data (import data). In step S422, the image forming apparatus 112 or 113 displays the result of the restoration process on the operation panel 134 of the image forming apparatus 112 or 113, and the this flow is ended. FIG. 5C illustrates a screen 309 as the display of the result in step S422. The backup data uploaded to the backup server 100 and the import data downloaded to the image forming apparatus 112 or 113 may not be completely the same. Data obtained by altering or deleting some items in the backup data may be treated as the import data.

<Server>

FIG. 2 is a block diagram illustrating a hardware configurations of the image forming apparatuses 111 to 113 and the hardware configuration of the backup server 100. The backup server 100 may be implemented using one or more computers, or may be implemented using one or more virtual computers implemented on a computer.

A computer used as the backup server 100 includes a central processing unit (CPU) 101, a read-only memory (ROM) 102, and a random-access memory (RAM) 103. The backup server 100 includes a storage interface (I/F) 104, an input/output I/F 105, and a network I/F 109. These components are connected by a bus 106. The backup server 100 includes hardware such as a storage 107, an input/output device 108, and the network I/F 109.

The input/output device 108 is a display, a keyboard, and pointing devices such as a mouse, a touchpad, a touch panel, and a trackball.

The network I/F 109 executes a communication control process with another device connected to a network 140.

The CPU 101 controls the entire computer used as the backup server 100. The CPU 101 starts an operating system (OS) according to a boot program stored in the ROM 102. The RAM 103 is used as a temporary storage area such as a main memory or a work area for the CPU 101. The storage 107 stores a program for controlling the entire computer of the backup server 100, and an application program for achieving a backup service. As the storage 107, a large-capacity storage such as a hard disk drive (HDD) or a solid-state drive (SSD) is used.

The CPU 101 controls the backup server 100 by executing a control program or an application program read from the ROM 102 or the storage 107 and loaded into the RAM 103. In the backup server 100 according to the present exemplary embodiment, a single CPU 101 executes processes illustrated in the flowcharts described below, using a program loaded into a single memory (the RAM 103). Alternatively, another form may be employed. For example, a plurality of processors, RAMs, ROMs, and storages can also cooperate to execute the processes illustrated in the flowcharts described below.

Figure 3A:
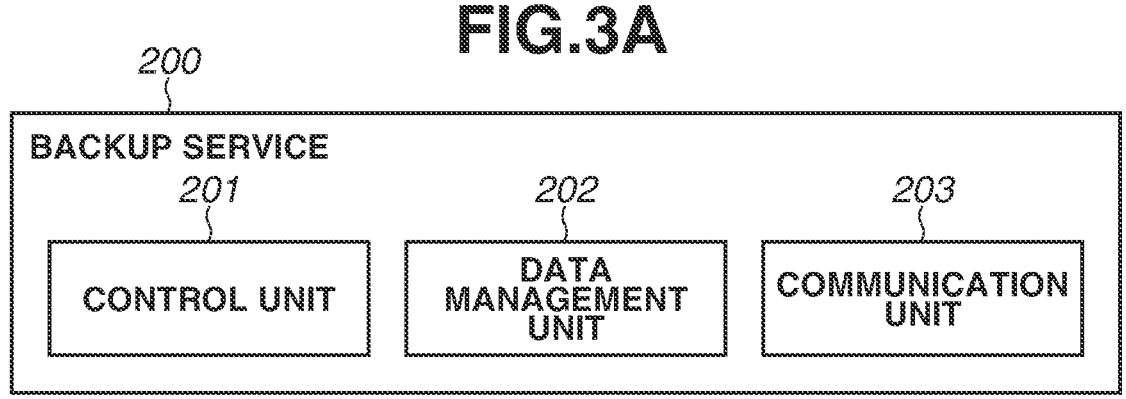
FIG. 3A is a block diagram illustrating a configuration of a backup service.

FIG. 3A is a block diagram illustrating a configuration of a backup service 200. The backup server 100 includes a control unit 201, a data management unit 202, and a communication unit 203. The backup server 100 achieves a backup function by the CPU 101 loading a program stored in the ROM 102 or the storage 107 into the RAM 103 and executing the program. The control unit 201 is a software module that receives a processing request from the image forming apparatus 111 and executes various processes. The data management unit 202 stores and references data in a database included in the storage 107. To store backup data of the image forming apparatus 111, the data management unit 202 prepares on the storage 107 a tenant for the customer 110 who owns the image forming apparatus 111 as described above. Then, the data management unit 202 stores the backup data on the tenant of the customer 110. The communication unit 203 is a software module that controls communication with an external device connected to the backup server 100 via the network I/F 109.

<Image Forming Apparatus>

The configurations of the image forming apparatuses 111 to 113 are described. For ease of description, configurations of the image forming apparatuses 111 to 113 are regarded as being alike, and only the configuration of the image forming apparatus 111 is described on behalf of the configurations of the image forming apparatuses 111 to 113.

The image forming apparatus 111 includes a controller 120, a camera 323, an operation panel 134, a wireless communication unit 135, a storage 130, a printer 131, and a scanner 132.

The printer 131 is an image forming unit that forms an image on a sheet based on bitmap data. The printer 131 may be an electrophotographic device or an inkjet device.

The scanner 132 scans a document using an optical reading device such as a charge-coupled device (CCD) sensor and converts image information regarding an image on the document into electric signal data. Image data obtained by reading the image on the document is stored in the storage 130 and used in a printing process.

The operation panel 134 is an operation unit that displays information to the user and receives an instruction from the user. The operation panel 134 includes a display that displays information, a hardware key that receives an operation of the user, and a touch sensor that detects a touch on a screen. The operation panel 134 may include hardware keys such as a start button for starting copying, a state confirmation button for confirming the status of the image forming apparatus 111, and a stop button for stopping printing.

The wireless communication unit 135 is a wireless communication unit for wirelessly communicating with an external apparatus. As the wireless communication unit 135, for example, a communication unit capable of communicating using NFC or a communication unit capable of communicating using Bluetooth is used.

The camera 323 is an imaging unit that captures (reads) an image of the user or a barcode. The camera 323 is used to, for example, recognize the face of the user operating the operation panel 134.

The storage 130 stores a program for controlling the entire image forming apparatus 111, and various application programs. As the storage 130, a large-capacity storage such as an HDD or an SSD is used.

The controller 120 includes a CPU 121, a ROM 122, a RAM 123, an operation panel I/F 127, a network I/F 128, a storage I/F 126, and a device I/F 124. These components are connected via a bus 129 so that the components can communicate with each other.

The CPU 121 controls the image forming apparatus 111 by executing a control program or an application program read from the ROM 122 or the storage 130 and loaded into the RAM 123. The controller 120 including the CPU 121 controls the entire image forming apparatus 111. The CPU 121 starts an OS according to a boot program stored in the ROM 122. The RAM 123 is used as a temporary storage area such as a main memory or a work area for the CPU 121.

The CPU 121 performs communication for exchanging data and a control signal with the operation panel 134, the camera 323, and the wireless communication unit 135 via the operation panel I/F 127. The CPU 121 performs communication for exchanging data and a control signal with the storage 130 via the storage I/F 126. The CPU 121 performs communication for exchanging data and a control signal with the printer 131 and the scanner 132 via the device I/F 124.

The network I/F 128 is an interface for connecting to the network 140. The network I/F 128 is connected to, for example, a wired LAN. The network I/F 128 may be a wireless network I/F.

In the present exemplary embodiment, a single CPU 121 executes processes using a program loaded into a single memory (RAM 123). Alternatively, another form may be employed. For example, a plurality of processors, RAMs, ROMs, and storages can also cooperate to execute the processes illustrated in the flowcharts described below. Yet alternatively, some of the processes may be executed using a hardware circuit such as an application-specific integrated circuit (ASIC) or a field-programmable gate array (FPGA). Although a plurality of devices is connected to a single interface, a single interface may be prepared for a single device.

Figure 3B:
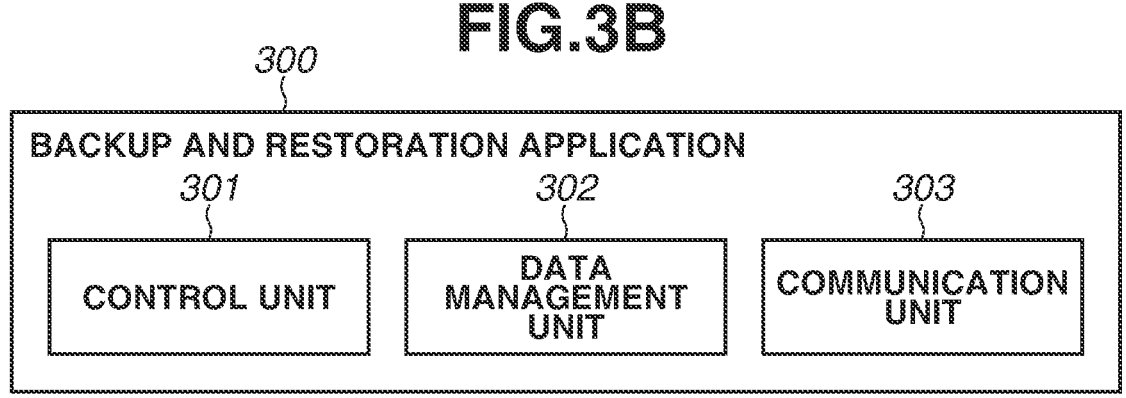
FIG. 3B is a block diagram illustrating a configuration of a backup and restoration application.

FIG. 3B is a block diagram illustrating an example of the software configurations of the image forming apparatus 111 to 113. A backup and restoration application 300 includes a control unit 301, a data management unit 302, and a communication unit 303. The control unit 301 is a software module that receives an instruction from the operation panel 134 to execute various processes, and executes the various processes.

The data management unit 302 reads data serving as backup data from the storage 130 and stores the data in the data management unit 202 of the backup server 100.

The data management unit 302 performs a restoration process for restoring backup data acquired from the data management unit 202 of the backup server 100. The communication unit 303 is a software module that controls communication with an external device.

<Mobile Terminal>

Figure 6:
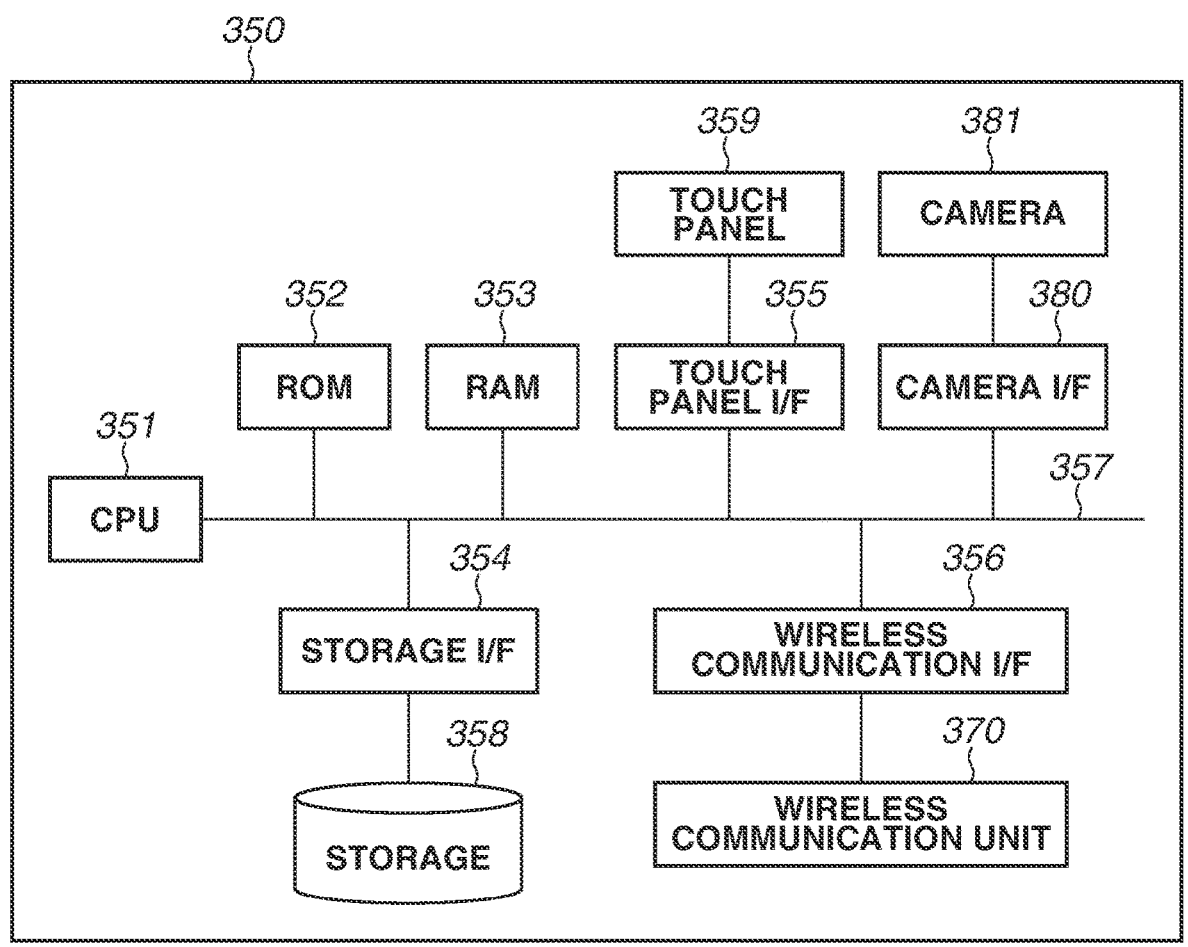
FIG. 6 is a block diagram illustrating a hardware configuration of a mobile terminal.

FIG. 6 is a block diagram illustrating a hardware configuration of the mobile terminal 350. The mobile terminal 350 includes a CPU 351, a ROM 352, a RAM 353, a storage I/F 354, a touch panel I/F 355, a wireless communication I/F 356, and a camera I/F 380. These components are connected via a bus 357. The mobile terminal 350 includes a storage 358, a touch panel 359, a wireless communication unit 370, and a camera 381. These components are connected to the bus 357 via the I/Fs.

The CPU 351 starts an OS according to a boot program stored in the ROM 352. The RAM 353 is used as a temporary storage area such as a main memory or a work area for the CPU 351. The CPU 351 controls the mobile terminal 350 by executing a control program or an application program read from the ROM 352 or the storage 358 and loaded into the RAM 353.

The CPU 351 performs communication for exchanging data and a control signal with the touch panel 359 via the touch panel I/F 355. The CPU 351 performs communication for exchanging data and a control signal with the camera 381 via the camera I/F 380. The CPU 351 performs communication for exchanging data and a control signal with the storage 358 via the storage I/F 354. The CPU 351 performs communication for exchanging data and a control signal with the wireless communication unit 370 via the wireless communication I/F 356.

The touch panel 359 is an operation unit (operation device) having a function as a display unit that displays information, and a function as an input unit that receives the input of information. As the display unit, a liquid crystal display is used. As the input unit, a touch sensor is used.

The storage 358 is a large-capacity storage that stores information. As the storage 358, a flash memory is used. The storage 358 stores a program for controlling the entire mobile terminal 350, and various application programs.

The camera 381 is an imaging unit (imaging device) that captures an image.

The wireless communication unit 370 is a communication unit (communication device) that wirelessly communicates with an external apparatus. As the wireless communication unit 370, for example, a communication unit capable of communicating using NFC or a communication unit capable of communicating using Bluetooth is used.

Figure 3C:
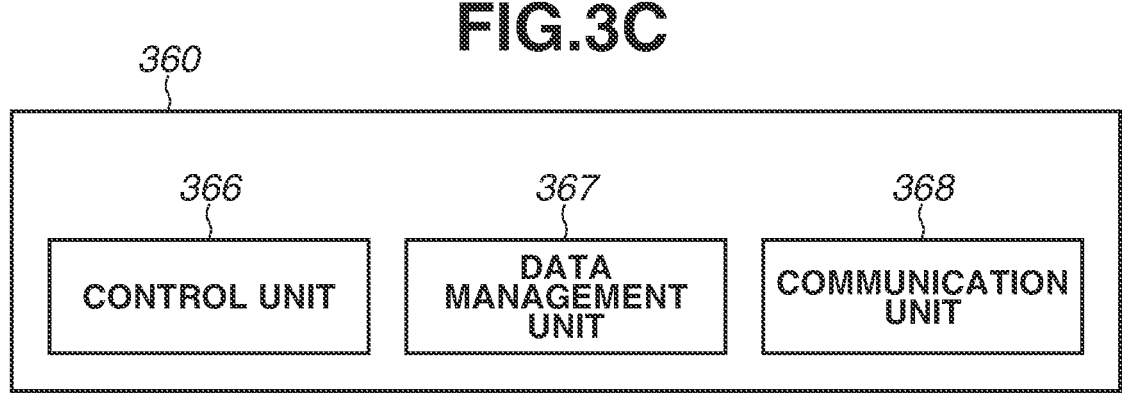
FIG. 3C is a block diagram illustrating a configuration of a mobile application.

FIG. 3C is a block diagram illustrating a software configuration of the mobile terminal 350. A mobile application 360 includes a control unit 366, a data management unit 367, and a communication unit 368. The control unit 366 is a software module that receives an instruction from the touch panel 359 to execute various processes, and executes the various processes.

The data management unit 367 stores the information 330 acquired from the data management unit 302 of an old apparatus (image forming apparatus 111) and holds the information 330 so that the information 330 can be transferred to the data management unit 302 of a new apparatus (image forming apparatus 112 or 113). The communication unit 368 is a software module that controls communication with an external device.

<Operation Screen (Mobile)>

Figure 7:
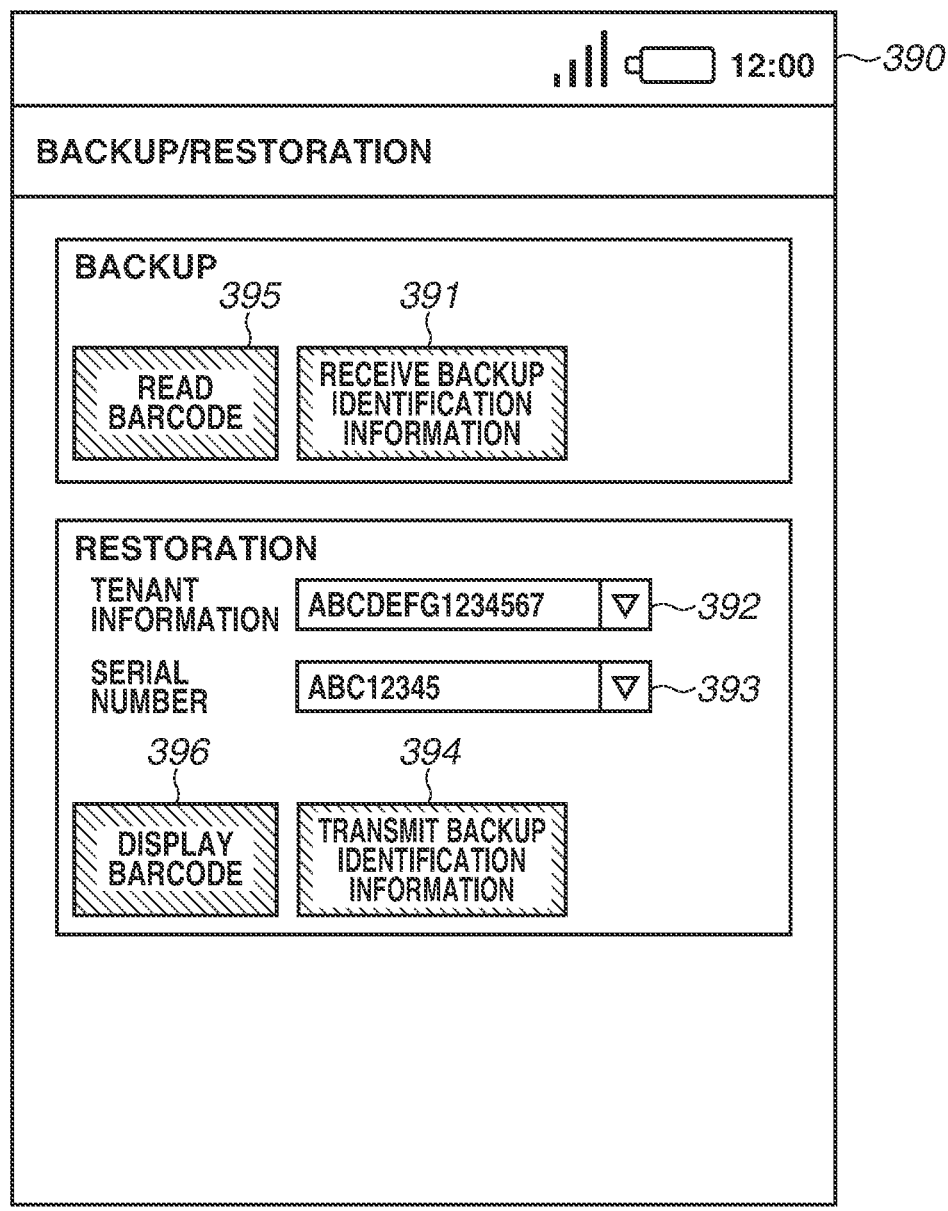
FIG. 7 is a diagram illustrating a screen displayed on an operation unit of the mobile terminal.

FIG. 7 is a diagram illustrating a screen displayed on the operation unit of the mobile terminal 350. The mobile terminal 350 executes a stored program and thereby can cause the mobile application 360 to operate.

An operation screen 390 of the mobile application 360 includes, for example, a "receive backup identification information" button 391, a "tenant information" field 392, a "serial number" field 393, a "transmit backup identification information" button 394, a "read barcode" button 395, and a "display barcode" button 396.

To perform the procedure of backup, the "receive backup identification information" button 391 or the "read barcode" button 395 is used. If the "receive backup identification information" button 391 is selected, the information 330 including tenant information as a backup destination and a serial number is acquired from an old apparatus (e.g., image forming apparatus 111) through wireless communication. The acquired information 330 is saved in the storage 358 of the mobile terminal 350 and can be selected as an option when restoration is performed. The "read barcode" button 395 is a button to be pressed to acquire the information 330 from the old apparatus (e.g., image forming apparatus 111) via a barcode.

To perform the procedure of restoration, the "transmit backup identification information" button 394 or the "display barcode" button 396 is used in addition to the "tenant information" field 392 and the "serial number" field 393. If the "transmit backup identification information" button 394 is pressed in a state where tenant information and a serial number are specified in the "tenant information" field 392 and the "serial number" field 393, respectively, on the screen of the mobile application 360, the information 330 is transmitted to a new apparatus (e.g., image forming apparatus 112 or 113). Alternatively, after values are specified in the "tenant information" field 392 and the "serial number" field 393 on the screen of the mobile application 360, the "display barcode" button 396 is pressed. As a result, a two-dimensional barcode (not illustrated) corresponding to the information 330 is displayed and can be read by the camera 323.

<Operation Screen (Image Forming Apparatus)>

Figure 4B:
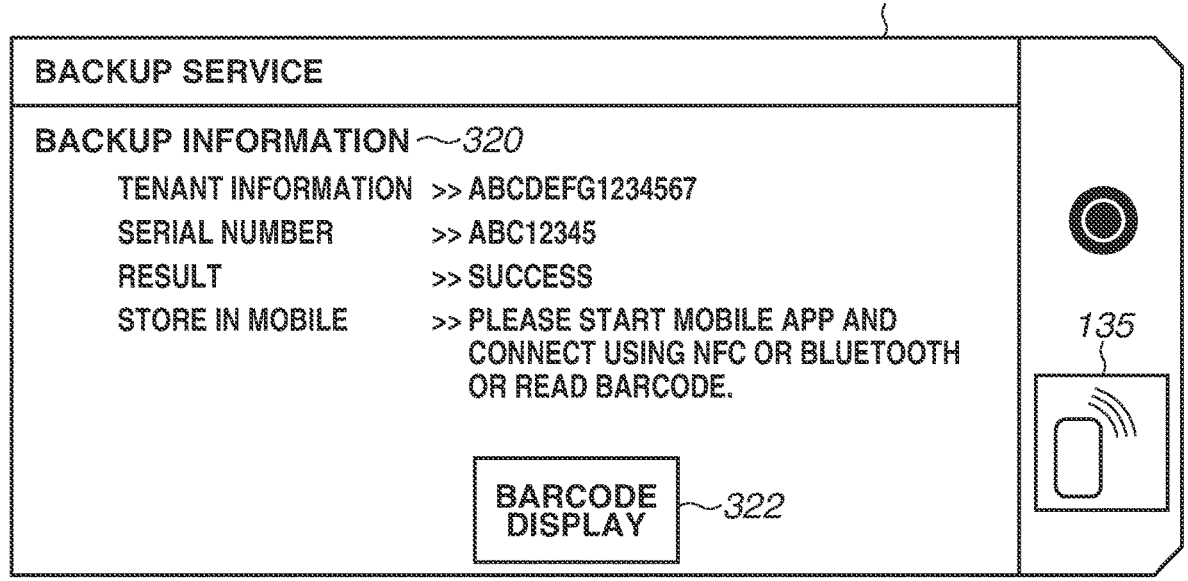

If the backup and restoration application 300 is executed in the image forming apparatus 111, then as illustrated in FIG. 4A, the backup screen 305 for the backup service 200 is displayed on the operation panel 134. FIG. 4A is a diagram illustrating a backup screen. FIG. 4B is a diagram also illustrating a backup screen.

On the backup screen 305, a "tenant information" field 310, a "serial number" field 311, and a "start backup" button 312 are placed. Near a display portion of the operation panel 134, the camera 323 and the wireless communication unit 135 are placed.

The "tenant information" field 310 is an input field to which information indicating a customer tenant area where backup data to be used is stored is input. The tenant information is input using a software keyboard (not illustrated) or the like.

The "serial number" field 311 is a field for confirming information for identifying an image forming apparatus from which backup data is created. To the "serial number" field 311, the serial number of the image forming apparatus 111 is input in advance.

The "start backup" button 312 is a button for giving an instruction to execute a backup process. If the "start backup" button 312 is pressed in a state where information is input to the "tenant information" field 310, the execution of the backup process is started. If the backup process is executed, the data management unit 202 stores backup data of the image forming apparatus 111.

If the "start backup" button 312 is selected, the operation panel 134 displays a backup screen 306 as illustrated in FIG. 4B. On the backup screen 306, backup information 320 is placed.

The backup information 320 is a group of pieces of information indicating tenant information as a backup destination, a serial number, and success or failure.

Only if the backup is successful, a message urging the user to store information in the mobile terminal 350 is displayed. If the backup is successful, communication data for wireless communication (NFC or Bluetooth) is generated based on the tenant information and the serial number. This communication data is transmitted from the image forming apparatus 111 to the mobile terminal 350 by the wireless communication unit 135 and the mobile terminal 350 coming close to each other. Thus, the user brings the mobile terminal 350 close to the wireless communication unit 135 and thereby can store in the mobile terminal 350 the information 330 as the tenant information and the serial number with which the backup is successful. If the backup is successful, a two-dimensional barcode 322 is generated based on the tenant information and the serial number and displayed on the backup screen 306. By the camera 381 reading the two-dimensional barcode 322 using the mobile application 360 operating on the mobile terminal 350, the information 330 as the tenant information and the serial number with which the backup is successful can be stored in the mobile terminal 350. Both in a case where the information 330 is acquired from the wireless communication unit 135 and in a case where the information 330 is acquired from the two-dimensional barcode 322, the information 330 is stored as similar data in the mobile terminal 350. Hereinafter, a description will be given using as an example a case where the information 330 is acquired via the wireless communication unit 135.

If the backup and restoration application 300 is executed in the image forming apparatus 112 or 113, then as illustrated in FIG. 5A, the restoration service screen 307 is displayed on the operation panel 134. FIG. 5A, 5B, 5C are diagrams each illustrating a restoration screen.

On the restoration service screen 307, a "tenant information" field 340, a "serial number" field 341, and a "start search" button 342 are placed.

The "tenant information" field 340 is an input field to which information indicating a customer tenant area is input.

The "serial number" field 341 is an input field to which a serial number for identifying an image forming apparatus from which backup data is created can be input.

The "start search" button 342 is a button for starting to search data backed up by the data management unit 202 of the backup server 100 for desired backup data.

To the "tenant information" field 340 and the "serial number" field 341, values can be manually input using a software keyboard (not illustrated) and the like.

Instead of manual input, using the information 330 stored in the mobile application 360, values can be input to the "tenant information" field 340 and the "serial number" field 341. For example, after the "transmit backup identification information" button 394 is selected in the mobile terminal 350, the mobile terminal 350 is brought close to the wireless communication unit 135 in a state where the restoration service screen 307 is displayed. Then, wireless communication is performed between the wireless communication unit 135 and the wireless communication unit 370, and the information 330 is transmitted from the mobile terminal 350 to the image forming apparatus (112 or 113). Alternatively, after the "display barcode" button 396 is selected in the mobile terminal 350, a displayed two-dimensional barcode (not illustrated) is passed over the camera 323. Then, the camera 323 reads the barcode, and the image forming apparatus (112 or 113) can acquire the information 330 from the barcode. If the image forming apparatus (112 or 113) acquires the information 330, values based on the information 330 are input to the "tenant information" field 340 and the "serial number" field 341.

Although data is obtained by different methods via the wireless communication unit 135 and the camera 323, it is assumed that the information 330 obtained via the wireless communication unit 135 and the camera 323 is similar data, and the following description will be given of only a case where the information 330 is obtained via the wireless communication unit 135.

FIG. 5B is an example of a screen indicating the result of the data search in FIG. 5A. A screen 308 includes restoration information 343, a backup data list 345, and a "start restoration" button 346.

The restoration information 343 is information regarding the previous restoration result and includes information indicating the date and time and success or failure. The backup data list 345 is a list of the results of searching for backup data that are acquired from the data management unit 202 of the backup server 100. In the backup data list 345, only backup data associated with the serial number transmitted on the restoration service screen 307 is placed. In this case, as information for identifying backup data, the date and time is displayed. If a single piece of backup data is specified from the backup data list 345, and the "start restoration" button 346 is pressed, a restoration process is executed.

FIG. 5C is an example of a screen indicating the result of executing the restoration process in FIG. 5B.

Restoration information 347 is information for notifying the user of information regarding the restoration result indicating the date and time and success or failure.

<Backup Process (Image Forming Apparatus)>

Figure 9:
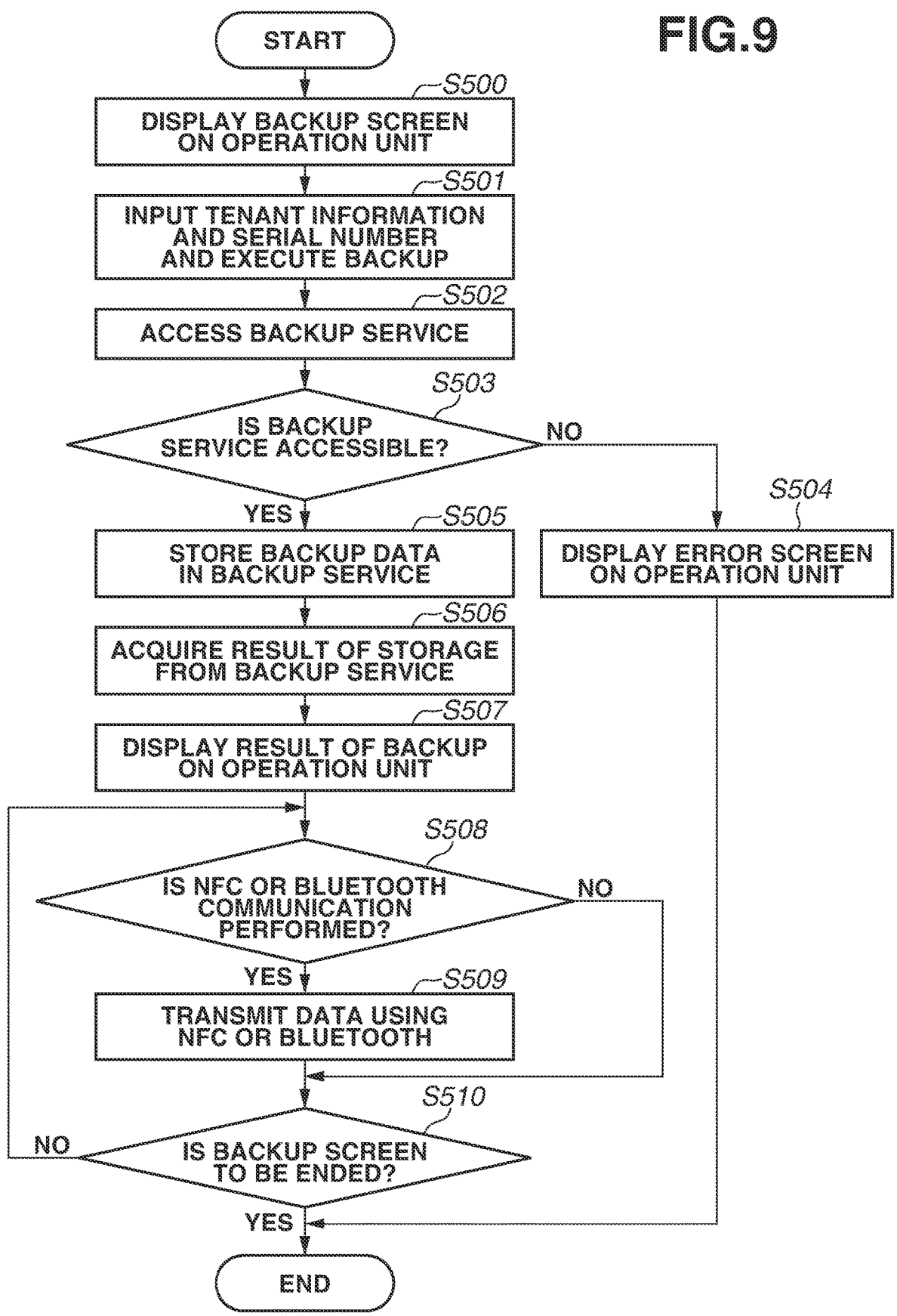
FIG. 9 is a flowchart illustrating a backup process performed by the image forming apparatus.

FIG. 9 is a flowchart executed in a case where a backup process is performed by the image forming apparatus 111. The processing illustrated in the flowchart is achieved by the CPU 121 included in the image forming apparatus 111 loading a program stored in the ROM 122 or the storage 130 into the RAM 123 and executing the program.

In step S500, the CPU 121 displays the backup screen 305 in FIG. 4A on the operation panel 134 of the image forming apparatus 111.

In step S501, after tenant information and a serial number are input on the backup screen 305, if the "start backup" button 312 is pressed, the CPU 121 executes backup.

In step S502, the CPU 121 accesses the backup server 100 via the network 140.

In step S503, if the CPU 121 cannot access the backup server 100 (NO in step S503), the processing proceeds to step S504. In step S504, the CPU 121 displays an error screen (not illustrated) on the operation panel 134, and terminates the flowchart in FIG. 9.

If the CPU 121 can access the backup server 100 in step S503 (YES in step S503), the processing proceeds to step S505. In step S505, the CPU 121 stores backup data in the storage 107 of the backup server 100.

In step S506, the CPU 121 acquires from the backup server 100 the result of storing the backup data.

In step S507, the CPU 121 displays the backup screen 306 in FIG. 4B as the result of the backup on the operation panel 134.

In step S508, if the mobile terminal 350 performs NFC or Bluetooth communication (YES in step S508), the processing proceeds to step S509. In step S509, the CPU 121 transmits the information 330 regarding the tenant information and the serial number to the mobile terminal 350.

In step S510, if the operation of ending the display in FIG. 4B is performed on the operation panel 134 (YES in step S510), the flowchart is ended. If the operation of ending the display in FIG. 4B is not performed on the operation panel 134 (NO in step S510), the processing returns to step S508.

<Backup Process (Server)>

Figure 10:
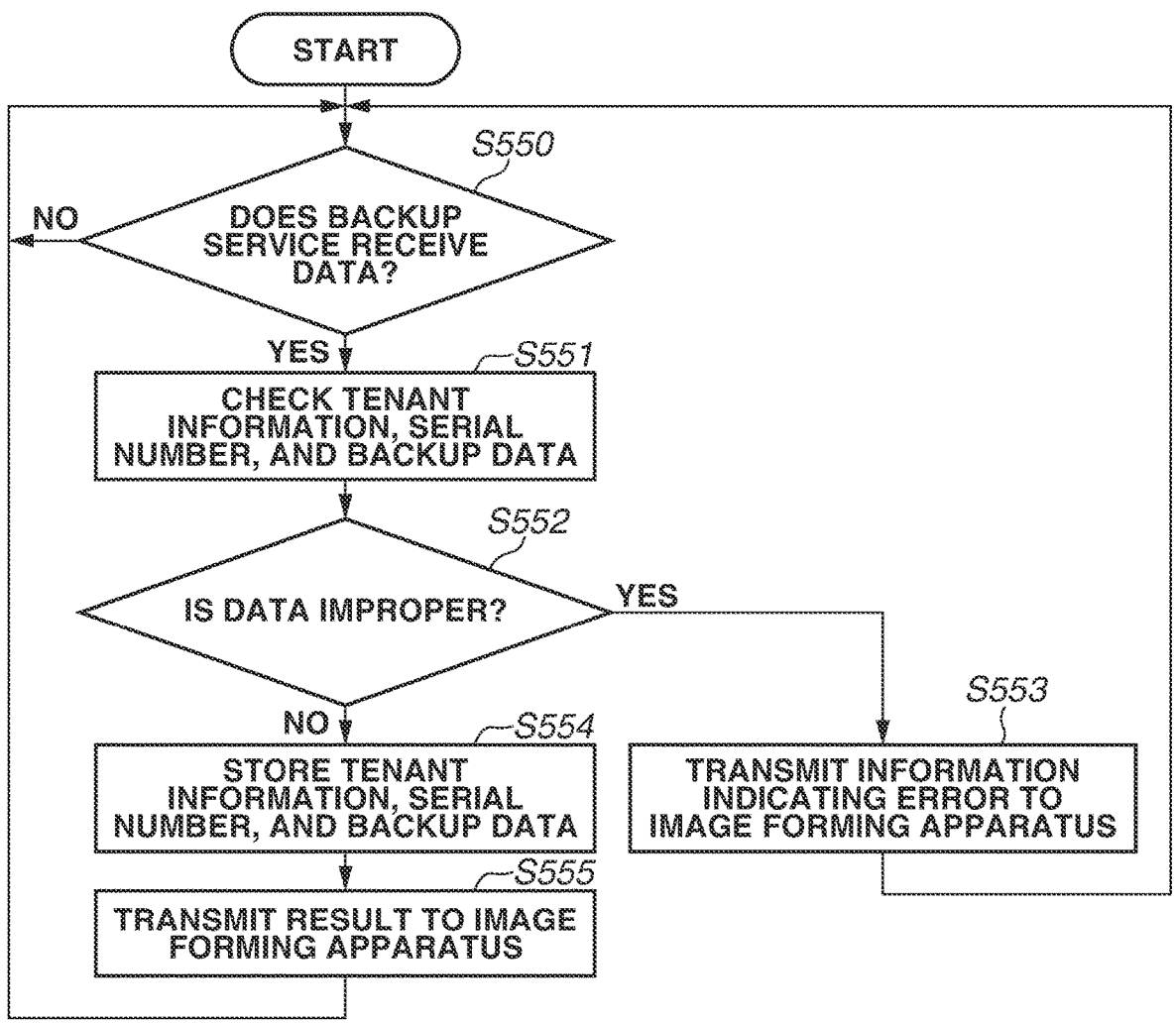
FIG. 10 is a flowchart illustrating a backup process performed by the server.

FIG. 10 is a flowchart executed in a case where a backup process is performed by the backup server 100. The processing illustrated in the flowchart is achieved by the CPU 101 included in the backup server 100 loading a program stored in the ROM 102 or the storage 107 into the RAM 103 and executing the program.

In step S550, the CPU 101 continues waiting to receive tenant information, a serial number, and backup data from the image forming apparatus 111 (NO in step S550).

If the CPU 101 receives backup data (YES in step S550), the processing proceeds to step S551. In step S551, the CPU 101 checks the received data. In step S552, if it is determined that the data is improper (YES in step S552), the processing proceeds to step S553. In step S553, the CPU 101 transmits information indicating an error to the image forming apparatus 111.

If it is determined in step S552 that the data is not improper (NO in step S552), the processing proceeds to step S554. In step S554, the CPU 101 stores in the storage 107 the tenant information, the serial number, and the backup data received from the image forming apparatus 111.

In step S555, the CPU 101 transmits the result of the backup to the image forming apparatus 111, and terminates processing of the flowchart.

<Restoration Process (Image Forming Apparatus)>

Figure 11:
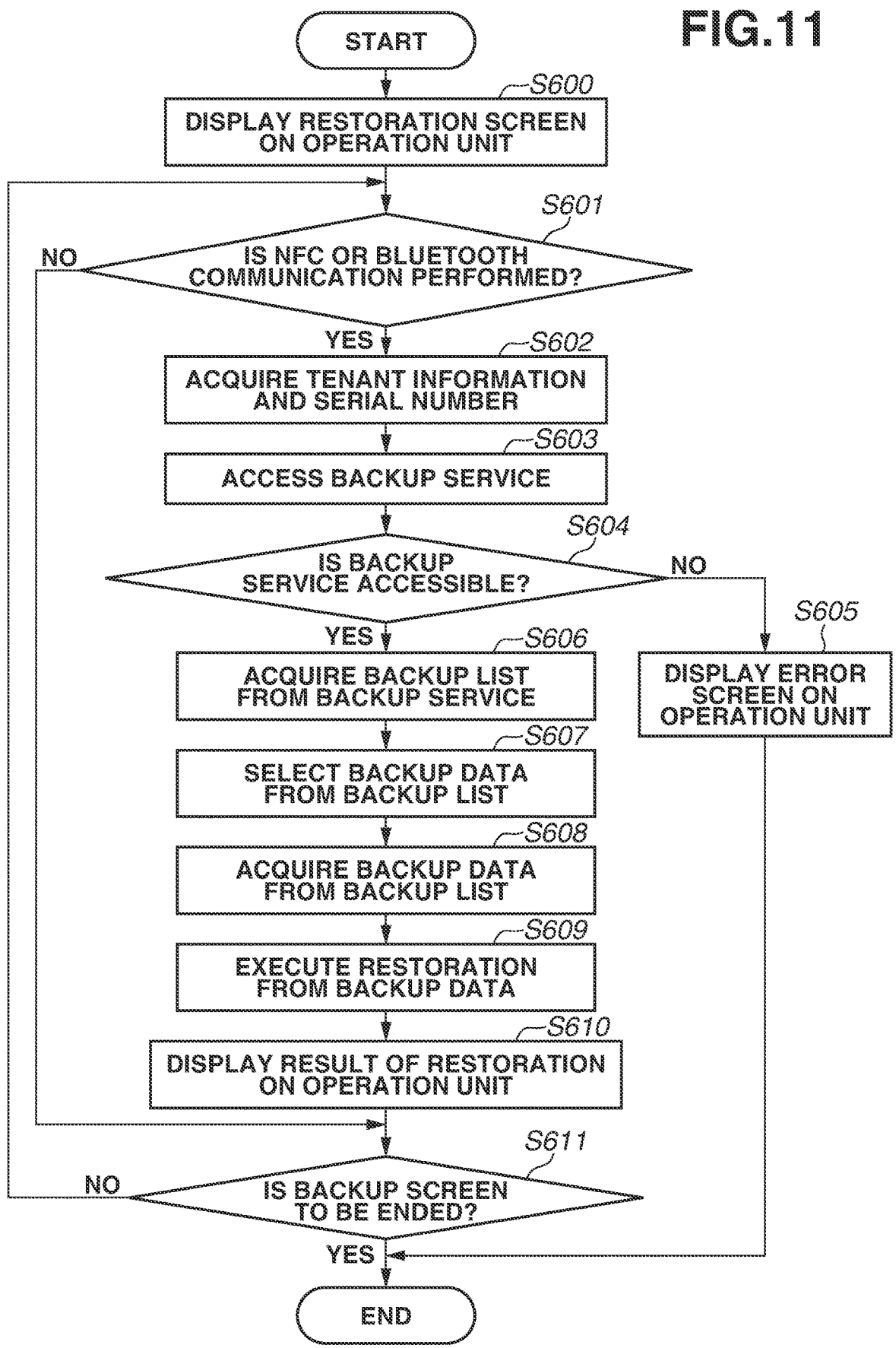
FIG. 11 is a flowchart illustrating a restoration process performed by the image forming apparatus.

FIG. 11 is a flowchart carried out in a case where a restoration process is performed by the image forming apparatus 111. The processing illustrated in the flowchart is achieved by the CPU 121 included in the image forming apparatus 111 loading a program stored in the ROM 122 or the storage 130 into the RAM 123 and executing the program.

In step S600, the CPU 121 displays the restoration service screen 307 in FIG. 5A on the operation panel 134.

At this time, the user starts the mobile application 360 in FIG. 7, then specifies values in the "tenant information" field 392 and the "serial number" field 393, and presses the "transmit backup identification information" button 394 so that the wireless communication unit 370 included in the mobile terminal 350 can communicate.

Then, in step S601, the CPU 121 determines whether the wireless communication unit 370 included in the mobile terminal 350 and the wireless communication unit 135 of the image forming apparatus 111 can communicate with each other. If the CPU 121 determines that the wireless communication unit 370 and the wireless communication unit 135 can communicate with each other through the NFC or Bluetooth communication (YES in step S601), the processing proceeds to step S602. If the CPU 121 determines that the wireless communication unit 370 and the wireless communication unit 135 cannot communicate with each other (NO in step S601), the processing proceeds to step S611.

In step S602, the CPU 121 acquires the tenant information and the serial number from the mobile terminal 350 through the NFC or Bluetooth communication. Then, in step S603, the CPU 121 accesses the backup server 100 using the acquired tenant information and serial number.

In step S604, the CPU 121 determines whether the CPU 121 can access the backup service in the backup server 100. If the CPU 121 cannot access the backup service in the backup server 100 (NO in step S604), the processing proceeds to step S605. In step S605, the CPU 121 displays an error screen (not illustrated) on the operation panel 134, and the flow ends.

In step S604, if the CPU 121 can access the backup service in the backup server 100 (YES in step S604), the processing proceeds to step S606. In step S606, the CPU 121 acquires a list of backup data stored in the storage 107 of the backup server 100.

In step S607, the CPU 121 displays the list on the operation panel 134, and the user selects data to be restored from the list. FIG. 5B illustrates the result of displaying the received list on the operation panel 134.

In step S608, the CPU 121 acquires the backup data stored in the storage 107 of the backup server 100.

In step S609, the CPU 121 performs a restoration process from the acquired backup data. In step S610, the CPU 121 displays the screen 309 in FIG. 5C on the operation panel 134.

In step S611, the CPU 121 determines whether the user performs the operation of ending the display in FIG. 5C. If the CPU 121 determines that the user has performed the operation of ending the display in FIG. 5C on the operation panel 134 (YES in step S611), the CPU 121 terminates the processing of the flowchart. If the user has not performed the operation of ending the display in FIG. 5C on the operation panel 134 (NO in step S611), the processing returns to step S601.

<Restoration Process (Server)>

Figure 12:
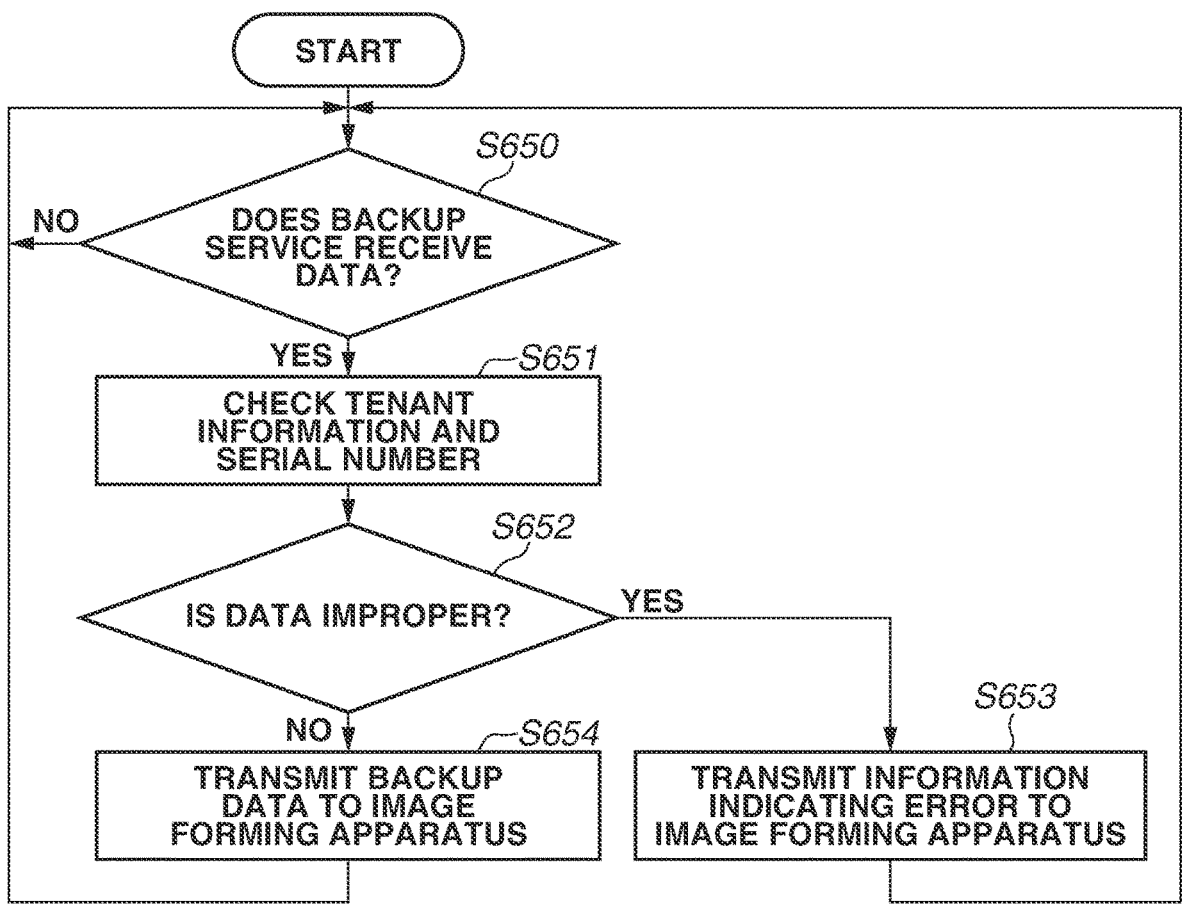
FIG. 12 is a flowchart illustrating a restoration process performed by the server.

FIG. 12 is a flowchart carried out in a case where a restoration process is performed by the backup server 100. The processing illustrated in the flowchart is achieved by the CPU 101 included in the backup server 100 loading a program stored in the ROM 102 or the storage 107 into the RAM 103 and executing the program.

In step S650, the CPU 101 determines whether the tenant information and the serial number are received from the image forming apparatus 111. If the tenant information and the serial number are not received (NO in step S650), the CPU 101 continues waiting to receive tenant information and the serial number from the image forming apparatus 111. If the CPU 101 receives tenant information and the serial number (YES in step S650), the processing proceeds to step S651.

In step S651, the CPU 101 checks the impropriety of the received data. In step S652, if it is determined that the data is improper (YES in step S652), the processing proceeds to step S653. In step S653, the CPU 101 transmits information indicating an error to the image forming apparatus 111.

In step S652, if it is determined that the data is not improper (NO in step S652), the processing proceeds to step S654. In step S654, the CPU 101 transmits backup data corresponding to the tenant information and the serial number stored in the storage 107 of the backup server 100 to the image forming apparatus 111, and the CPU 101 ends the processing of the flowchart.

<Remarks>

As described above, according to the present exemplary embodiment, it is possible to send information for specifying backup data to be used in restoration (import) from a new apparatus to an old apparatus via a mobile terminal. Thus, a user does not need to manually input the information for specifying the backup data. In particular, by causing a mobile terminal and an image forming apparatus to communicate with each other using short-range wireless communication such as NFC or Bluetooth, it is possible to transmit information by a simple operation such as a touch operation. Alternatively, using readable identification information such as a two-dimensional barcode, it is possible to transmit information by a simple operation such as passing the information over a camera or capturing an image of the information.

In the first exemplary embodiment, an example has been described where the serial number of the image forming apparatus 111 is used as identification information for specifying backup data. In a second exemplary embodiment, a case is described where a serial number and unique information included in the mobile terminal 350 are used as identification information for specifying backup data. The configuration of a system used in the second exemplary embodiment is alike that in the first exemplary embodiment, except for components regarding the above-described feature. Thus, components that are alike are designated by the same signs, and redundant detail thereon is omitted.

<Use Sequence>

Figure 15:
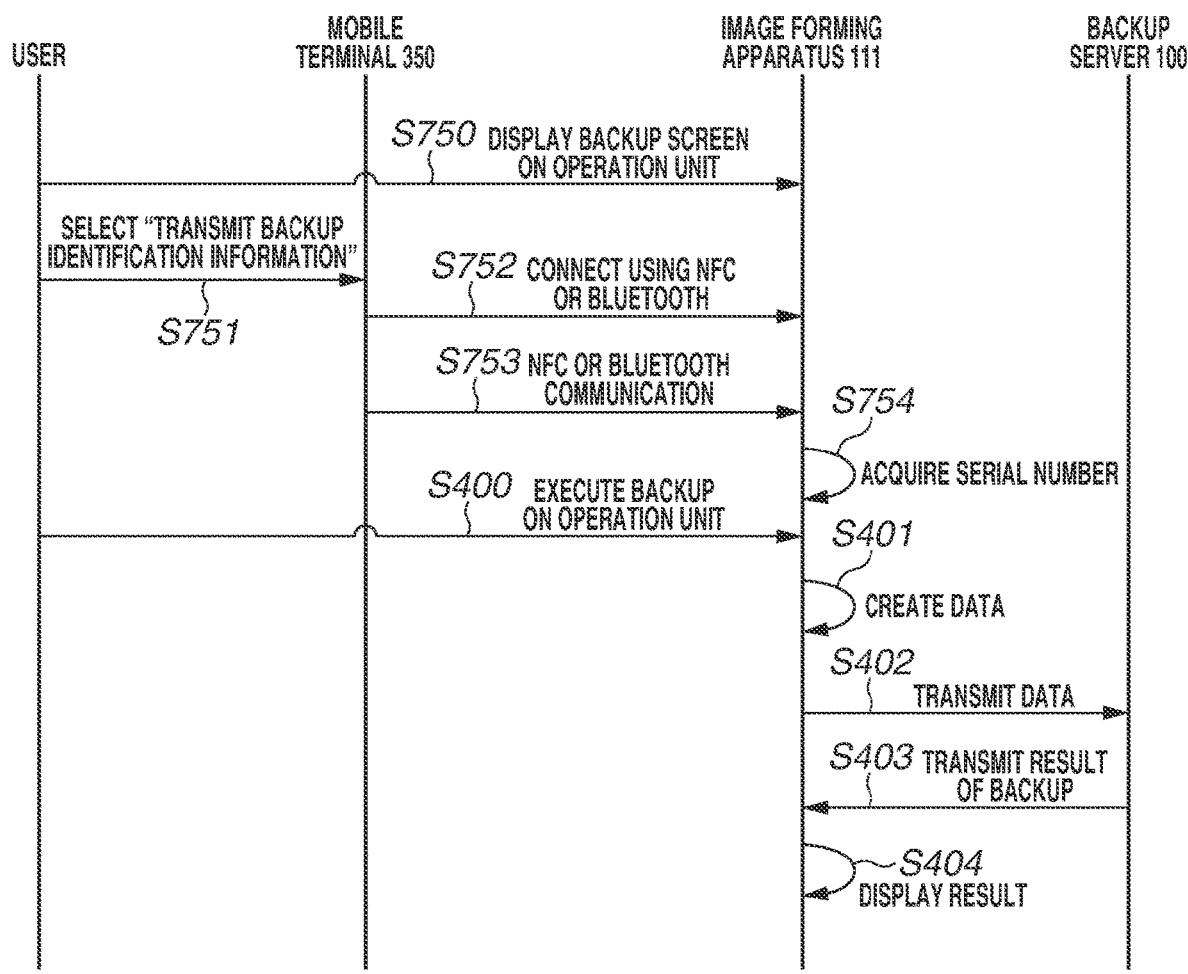
FIG. 15 is a sequence diagram illustrating a sequence of backup.

FIG. 15 is a sequence diagram illustrating a sequence of backup according to the second exemplary embodiment.

Figure 14:
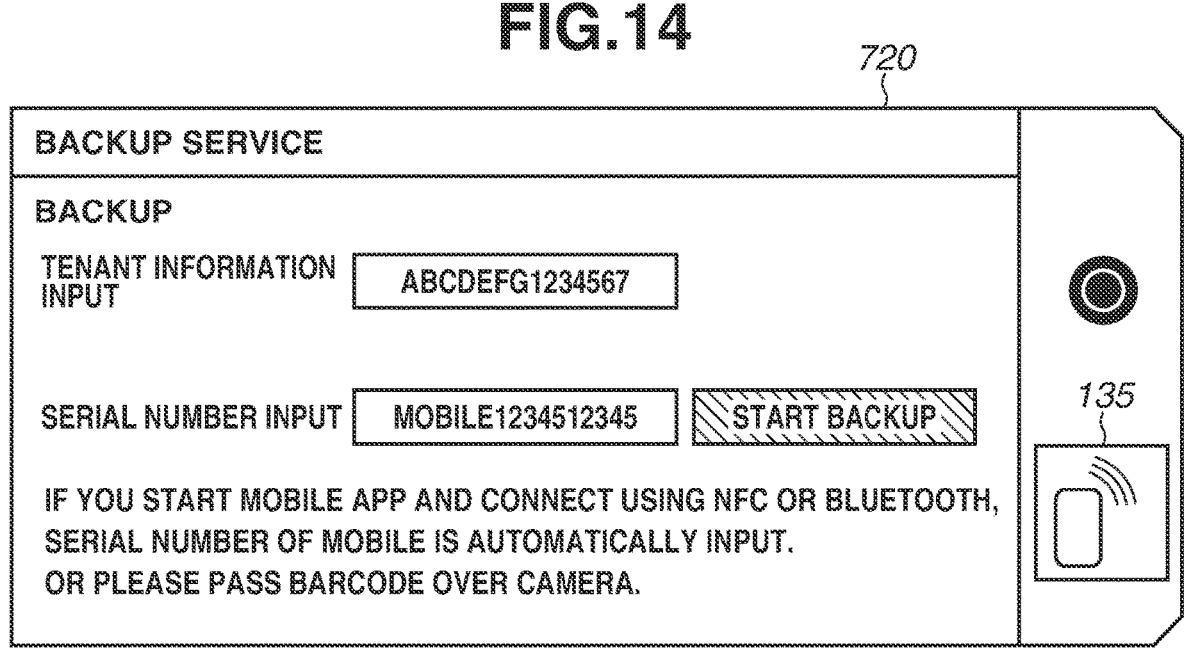
FIG. 14 is a diagram illustrating a backup screen displayed on an operation unit of an image forming apparatus.

In step S750, the user opens a screen 720 in FIG. 14 on the operation panel 134 of the image forming apparatus 111.

Figure 13:
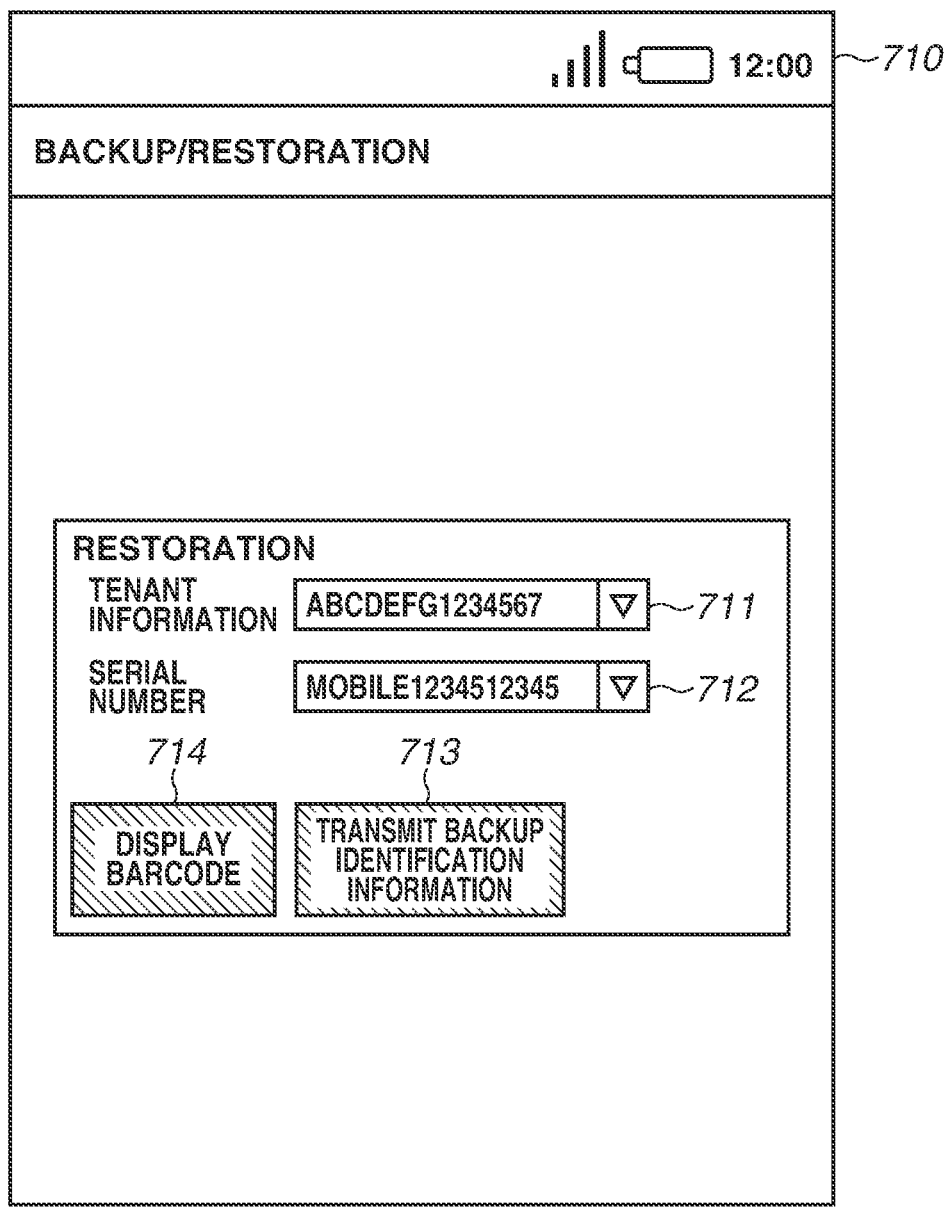
FIG. 13 is a diagram illustrating a screen displayed on an operation unit of a mobile terminal.

In step S751, the user starts the mobile application 360 in the mobile terminal 350, specifies tenant information, and then presses a "transmit backup identification information" button 713 in FIG. 13. A serial number and unique information included in the mobile terminal 350 are automatically extracted and automatically input to a "serial number" field 712.

Then, if the condition that the mobile terminal 350 and the wireless communication unit 135 come close to each other is satisfied, then in step S752, a connection between the wireless communication unit 370 of the mobile terminal 350 and the wireless communication unit 135 of the image forming apparatus 111 is established.

In step S753, the mobile terminal 350 performs the NFC or Bluetooth communication with the image forming apparatus 111 and transmits the information 330 to the image forming apparatus 111.

In step S754, the image forming apparatus 111 acquires the information 330 transmitted from the mobile terminal 350 so that the tenant information and the serial number are input to a "tenant information input" field and a "serial number input" field, respectively, on the screen 720.

The processes of steps S400 to S404 are alike those in the first exemplary embodiment. Although the processing is ended in step S404 in this case, the processes of steps S405 to S409 may be performed to notify the mobile terminal 350 that the backup is normally completed.

As in the first exemplary embodiment, the process regarding wireless communication may be replaced with the process of displaying and reading a two-dimensional barcode.

The sequence of restoration is alike that in the first exemplary embodiment, except that the serial number of the image forming apparatus 111 is replaced with that of the mobile terminal 350.

<Operation Screen (Mobile)>

FIG. 13 is a diagram illustrating a screen displayed on the operation unit of the mobile terminal 350. In the present exemplary embodiment, also when backup is performed, the mobile terminal 350 transmits information to the image forming apparatus 111.

On an operation screen 710 of the mobile application 360, a "tenant information" field 711, a "serial number" field 712, a "transmit backup identification information" button 713, and a "display barcode" button 714 are placed.

The "tenant information" field 711 is an input field to which information indicating a customer tenant area is input. To the "tenant information" field 711, a value can be manually input using a software keyboard (not illustrated) or the like.

The "serial number" field 712 is an input field to which a serial number for identifying a mobile terminal associated with an image forming apparatus from which backup data is created can be input. To the "serial number" field 712, the serial number of the mobile terminal 350 is automatically input in advance.

The "transmit backup identification information" button 713 is a button to be pressed to transmit the information 330 to an image forming apparatus (111, 112, or 113) through wireless communication.

The "display barcode" button 396 is a button to be pressed to cause the image forming apparatus to acquire the information 330 via a two-dimensional code.

To perform the procedure of backup, the "transmit backup identification information" button 713 is pressed in a state where the backup screen 305 is displayed on the operation panel 134 of an old apparatus (image forming apparatus 111), thereby causing the image forming apparatus 111 and the mobile terminal 350 to communicate with each other. Consequently, the information 330 is transmitted from the mobile terminal 350 to the image forming apparatus 111. Alternatively, the "display barcode" button 714 is pressed, and the image forming apparatus 111 is caused to acquire the information 330 via a two-dimensional barcode (not illustrated).

To perform the procedure of restoration, the "transmit backup identification information" button 713 is pressed in a state where the restoration service screen 307 is displayed on the operation panel 134 of a new apparatus (image forming apparatus 112 or 113, thereby causing the image forming apparatus 112 or 113 and the mobile terminal 350 to communicate with each other. In this way, the information 330 is transmitted from the mobile terminal 350 to the image forming apparatus 112 or 113. Alternatively, the "display barcode" button 714 is pressed, and the image forming apparatus 112 or 113 is caused to acquire the information 330 via a two-dimensional barcode (not illustrated).

<Operation Screen (Image Forming Apparatus)>

FIG. 14 is an example of a backup screen displayed on the operation panel 134 of the image forming apparatus 111. In the second exemplary embodiment, after the "transmit backup identification information" button 713 is pressed in the mobile application 360, if the image forming apparatus 111 is connected using NFC or Bluetooth, the serial number is transmitted from the mobile terminal 350 to the image forming apparatus 111.

<Backup Process (Image Forming Apparatus)>

Figure 16:
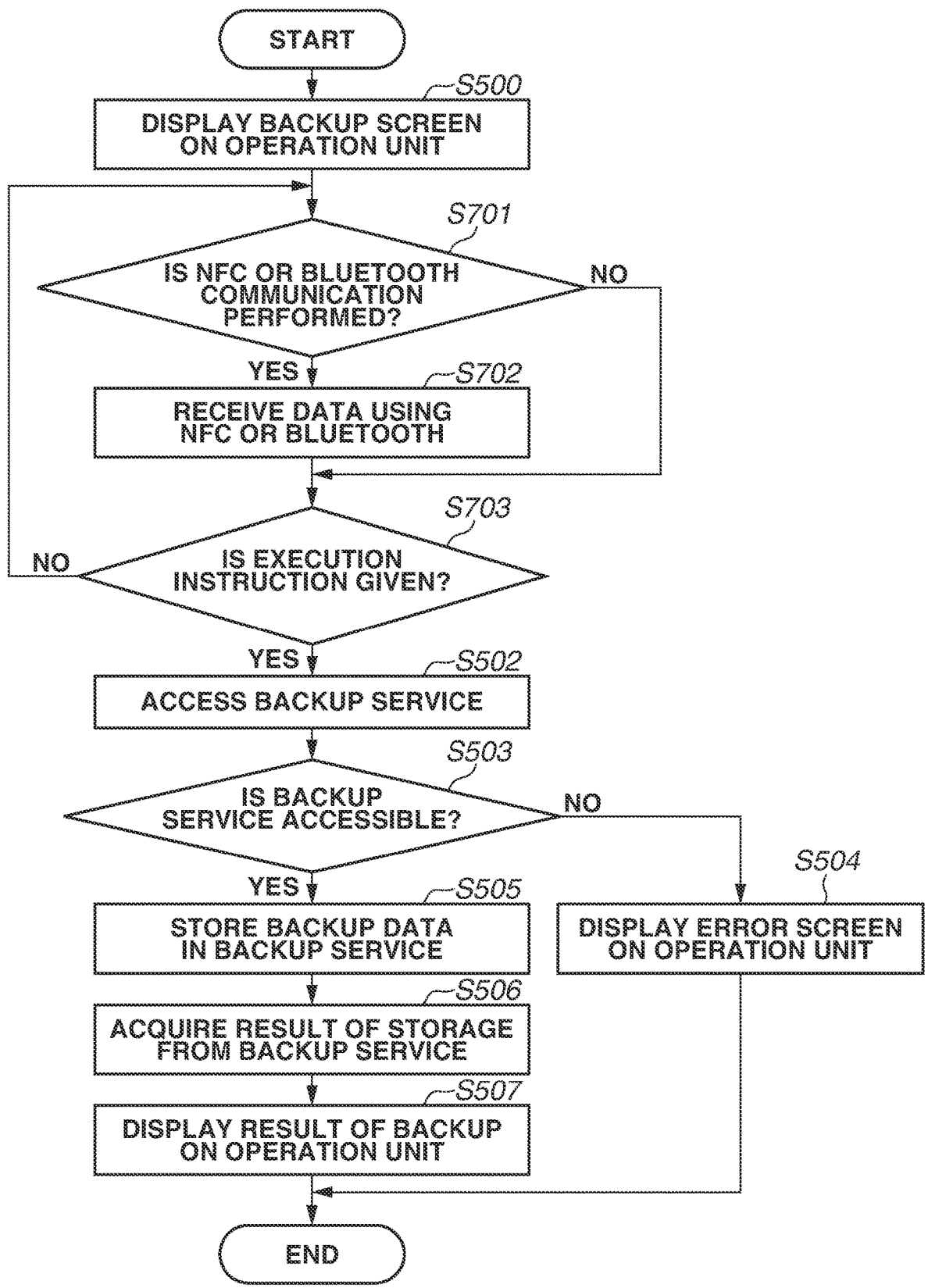
FIG. 16 is a flowchart carried out in a case where a backup process is performed by inputting a serial number to the mobile terminal.

FIG. 16 is a flowchart carried out in a case where a backup process is performed by inputting a serial number to the mobile terminal 350. The processing illustrated in the flowchart is achieved by the CPU 121 included in the image forming apparatus 111 loading a program stored in the ROM 122 or the storage 130 into the RAM 123 and executing the program.

Steps S500 and S502 to 507 are alike those in FIG. 9 in the first exemplary embodiment.

In step S701, the CPU 121 continues waiting until the image forming apparatus 111 is connected via NFC or Bluetooth communication (NO in step S701). If the image forming apparatus 111 is connected via NFC or Bluetooth communication (YES in step S701), the processing proceeds to step S702.

As the result of receiving data using NFC or Bluetooth in step S702, then in step S703, if it is determined that a serial number and unique information included in the mobile terminal 350 are input (YES in step S703), the processing proceeds to step S502. Then, the processes of step S502 and subsequent to that are executed. If it is determined in step S703 that the serial number and the unique information included in the mobile terminal 350 are not input (NO in step S703), the processing returns to step S701.

<Remarks>

As described above, in the second exemplary embodiment, a serial number and unique information included in a mobile terminal are used as identification information for specifying backup data. Thus, in a case where backup data of an old apparatus is to be imported into a new apparatus, it is possible to smoothly perform a series of processes.

In the first and second exemplary embodiments, a description has been given on the premise that a new apparatus (image forming apparatus 112 or 113) can connect to the backup server 100. A third exemplary embodiment is described on the premise of the state where a network setting is not completed in a new apparatus (image forming apparatus 112 or 113), and the new apparatus cannot connect to the backup server 100. Then, the setting is completed by inputting network information from the mobile terminal 350 to the new apparatus so that the new apparatus can acquire backup data from the backup server 100.

The configuration of a system used in the third exemplary embodiment is alike that in the first exemplary embodiment, except for components regarding the above feature. Thus, components that are alike are designated by the same signs, and redundant detail thereon is omitted.

<Operation Screen (Mobile)>

Figure 17:
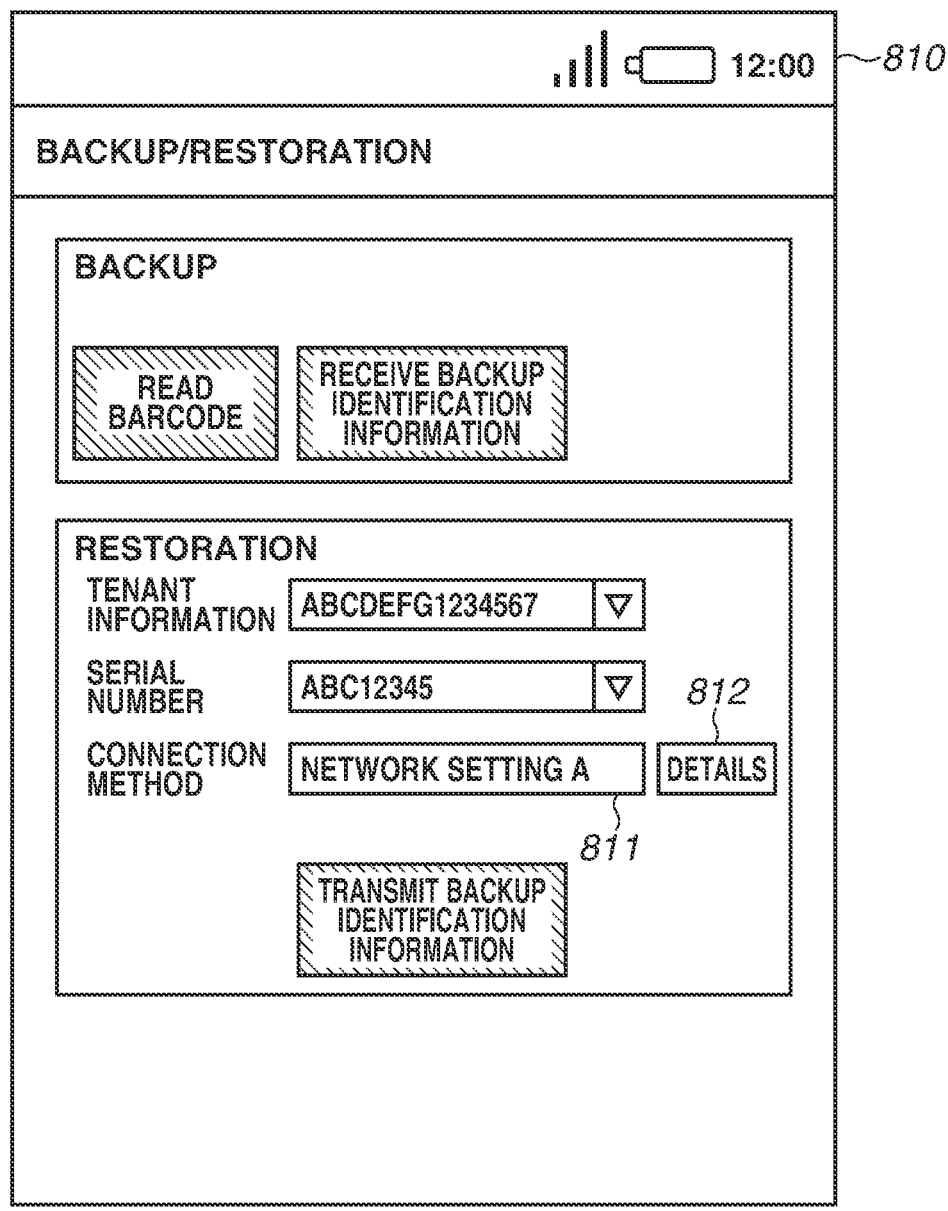
FIG. 17 is a diagram illustrating a screen displayed on an operation unit of a mobile terminal.

FIG. 17 is a diagram illustrating a screen displayed on the operation unit of the mobile terminal 350. On a screen 810, a "connection method" field 811 and a "details" button 812 are placed in addition to the components on the operation screen 390 described in the first exemplary embodiment.

In the "connection method" field 811, the name of a currently specified connection method is described. A connection method can be selected from among a plurality of candidates. The "details" button 812 is a button for transitioning to a details confirmation screen (not illustrated) for confirming the details of the currently specified connection method. On the details confirmation screen (not illustrated), wired or wireless can be specified, a Dynamic Host Configuration Protocol (DHCP) function can be turned on and off, network information such as an Internet Protocol (IP) address set for an image forming apparatus (112 or 113), and network information such as a Service Set Identifier (SSID) and an encryption key of a connection destination access point can be specified.

If the "transmit backup identification information" button 394 is selected in a state where a connection method is specified, then in addition to the information 330, network information is transmitted to the image forming apparatus (112 or 113).

<Restoration Process (Image Forming Apparatus)>

FIG. 18 is a flowchart carried out in a case where a restoration process is performed when an IP address is set in the mobile application 360. The processing illustrated in the flowchart is achieved by the CPU 121 included in the image forming apparatus 111 loading a program stored in the ROM 122 or the storage 130 into the RAM 123 and executing the program.

Steps S600, S601, and S603 to S609 are alike those described with reference to FIG. 11 in the first exemplary embodiment. Thus, redundant descriptions thereof are omitted.

In step S900, the CPU 121 acquires network setting information specified on the details confirmation screen (not illustrated) in addition to the information 330 including tenant information and a serial number. Then, in step S901, the CPU 121 makes a network setting based on the acquired network setting information.

<Remarks>

As described above, in the third exemplary embodiment, before accessing the backup server 100, the CPU 121 makes a network setting based on network setting information acquired from the mobile terminal 350. Thus, it is possible to import backup data of an old apparatus into a new apparatus without making a network setting in advance.

Other Exemplary Embodiments

In the first exemplary embodiment, an example has been described where a plurality of pieces of backup data is associated with a single serial number, and backup data to be imported is specified on the screen 308. Alternatively, only a single piece of backup data may be associated with a single serial number. Then, the display on the screen 308 may be skipped, and an import process may be started.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the scope of the present disclosure is not limited to the particular disclosed exemplary embodiments. The scope of the following claims is to be accorded the broadest interpretation so as to encompass all such modifications and equivalent structures and functions.

This application claims the benefit of Japanese Patent Application No. 2019-082334, filed Apr. 23, 2019, which is hereby incorporated by reference herein in its entirety.

What is claimed is:

1. An information processing system, comprising:
a first information processing apparatus having a first network interface for connecting to a network, and a first wireless communication interface for performing Near Field Communication;
a second information processing apparatus having a second network interface for connecting to a network, and a second wireless communication interface for performing Near Field Communication; and
a server configured to manage a plurality of backup data including at least one backup data of the first information processing apparatus associated with unique identification information of the first information processing apparatus,
wherein the first information processing apparatus transmits the unique identification information of first information processing apparatus to a mobile terminal through the first wireless communication interface,
wherein the second information processing apparatus receives the unique identification information of the first information processing apparatus from the mobile terminal through the second wireless communication interface, and transmits the unique identification information of the first information processing apparatus to the server,
wherein the server receives the unique identification information of the first information processing apparatus, specifies the one backup data from among the plurality of backup data based on the unique identification information of the first information processing apparatus, and transmits specified information of the one backup data to the second information processing apparatus,
wherein the second information processing apparatus receives the specified information, displays instruction screen, based on the specified information, for receiving instruction from a user, and transmits a request to the server,
wherein the server receives the request, and transmits import data based on the one backup data to the second information processing apparatus,
wherein the second information processing apparatus acquires the import data from the server via a network, and
executes an import process based on the import data.

2. The information processing system according to claim 1, wherein the first wireless communication interface is a near-field communication interface, and wherein the second wireless communication interface is a near-field communication interface.

3. The information processing system according to claim 1, wherein the first wireless communication interface is a Bluetooth communication interface, and wherein the second wireless communication interface is a Bluetooth communication interface.

4. The information processing system according to claim 1, wherein the unique identification information is a serial number of the first information processing apparatus.

5. The information processing system according to claim 1, wherein the first information processing apparatus includes a display configured to display information and configured to display a screen urging a user to cause the first information processing apparatus to wirelessly communicate with the mobile terminal.

6. The information processing system according to claim 1, wherein the second information processing apparatus includes a display configured to display information and configured to display a screen urging a user to cause the second information processing apparatus to wirelessly communicate with the mobile terminal.

7. The information processing system according to claim 1, wherein the first information processing apparatus includes a display configured to display information and configured to display a two-dimensional code.

8. The information processing system according to claim 1, wherein the second information processing apparatus includes an imaging device configured to capture an image and configured to read a two-dimensional code.

9. The information processing system according to claim 1, wherein the backup data includes at least any one of setting information regarding printing, setting information regarding scanning, setting information regarding facsimile, setting information regarding power, setting information regarding a sheet, setting information regarding communication, setting information regarding display, setting information regarding an application, setting information regarding a web browser, information regarding an address book, information regarding a user, setting information regarding Bluetooth Low Energy (BLE), setting information regarding NFC, setting information regarding a network, setting information regarding maintenance, and setting information regarding security.

10. A mobile terminal for use in a system that provides import data based on backup data of a first information processing apparatus to a second information processing apparatus via a server configured to manage a plurality of backup data, the mobile terminal comprising a wireless communication interface for performing Near Field Communication and at least one memory storing a program of instructions and at least one processor that executes the program of instructions to cause the mobile terminal to:
receive, from the first information processing apparatus which has transmitted one backup data of the first information processing apparatus and unique identification information of the first information processing apparatus to the server through the wireless communication interface, the unique identification information of the first information processing apparatus transmitted from the first information processing apparatus to the server; and
transmit the unique identification information of the first information processing apparatus to the second information processing apparatus through the wireless communication interface to cause the server to specify the one backup data form among the plurality of backup data and to cause the second information processing apparatus to download the import data based on the one backup data associated with the unique identification information of the first information processing.

11. A non-transitory computer-readable storage medium that stores a program for causing a mobile terminal for use in a system that provides import data based on backup data of a first information processing apparatus to a second information processing apparatus via a server configured to manage a plurality of backup data, the mobile terminal including a wireless communication interface for performing Near Field Communication and at least one processor and at least one memory, to execute a method, the method comprising:
receiving, from the first information processing apparatus which has transmitted backup data of the first information processing apparatus and unique identification information of the first information processing apparatus to the server through the wireless communication interface, the unique identification information of the first information processing apparatus transmitted from the first information processing apparatus to the server; and
transmitting the unique identification information of the first information processing apparatus to the second information processing apparatus through the wireless communication interface to cause the server to specify the one backup data form among the plurality of backup data and to cause the second information processing apparatus to download the import data based on the one backup data associated with the unique identification information of the first information processing.

12. An information processing system comprising:
a first information processing apparatus having a first network interface for connecting to a network, and a first wireless communication interface for performing Near Field Communication;
a second information processing apparatus having a second network interface for connecting to a network, and a second wireless communication interface for performing Near Field Communication; and
a server configured to manage a plurality of backup data,
wherein the first information processing apparatus receives the unique identification information of a mobile terminal to be associated with one backup data from the mobile terminal through the first wireless communication interface,
wherein the first information processing apparatus transmits the one backup data and the unique identification information of the mobile terminal to the server,
wherein the server receives the one backup data and the unique identification information of the mobile terminal, and manages the one backup data in association with the unique identification information of the mobile terminal,
wherein the second information processing apparatus receives the unique identification information of the mobile terminal from the mobile terminal through the second wireless communication interface, and transmits the unique identification information of mobile terminal to the server,
wherein the server receives the unique identification information of the mobile terminal, specifies the one backup data from among the plurality of backup data based on the unique identification information of the mobile terminal, and transmits specified information of the one backup data to the second information processing apparatus,
wherein the second information processing apparatus receives the specified information, displays instruction screen, based on the specified information, for receiving instruction from a user, and transmits a request to the server,
wherein the server receives the request, and transmits import data based on the one backup data to the second information processing apparatus,
wherein the second information processing apparatus acquires the import data from the server via a network, and
executes an import process based on the import data.

13. The information processing system according to claim 12, wherein the first wireless communication interface is a near-field communication interface, and wherein the second wireless communication interface is a near-field communication interface.

14. The information processing system according to claim 12, wherein the first wireless communication interface is a Bluetooth communication interface, and wherein the second wireless communication interface is a Bluetooth communication interface.

15. The information processing system according to claim 12, wherein the unique identification information is a serial number of the first information processing apparatus.

16. The information processing system according to claim 12, wherein the first information processing apparatus includes a display configured to display information and configured to display a screen urging a user to cause the first information processing apparatus to wirelessly communicate with the mobile terminal.

17. The information processing system according to claim 12, wherein the second information processing apparatus includes a display configured to display information and configured to display a screen urging a user to cause the second information processing apparatus to wirelessly communicate with the mobile terminal.

18. The information processing system according to claim 12, wherein the first information processing apparatus includes a display configured to display information and configured to display a two-dimensional code.

19. The information processing system according to claim 12, wherein the second information processing apparatus includes an imaging device configured to capture an image and configured to read a two-dimensional code.

20. The information processing system according to claim 12, wherein the backup data includes at least any one of setting information regarding printing, setting information regarding scanning, setting information regarding facsimile, setting information regarding power, setting information regarding a sheet, setting information regarding communication, setting information regarding display, setting information regarding an application, setting information regarding a web browser, information regarding an address book, information regarding a user, setting information regarding BLE, setting information regarding NFC, setting information regarding a network, setting information regarding maintenance, and setting information regarding security.

21. A mobile terminal for use in a system that provides import data based on backup data of a first information processing apparatus to a second information processing apparatus via a server configured to manage a plurality of backup data, the mobile terminal comprising a wireless communication interface for performing Near Field Communication and at least one memory storing a program of instructions and at least one processor that executes the program of instructions to cause the mobile terminal to:

transmit, to the first information processing apparatus which to be transmit one backup data of the first information processing apparatus and unique identification information of the mobile terminal through the wireless communication interface, the unique identification information to be associated with the one backup data transmitted from the first information processing apparatus to the server; and transmit the unique identification information of the mobile terminal to the second information processing apparatus through the wireless communication interface to cause the server to specify the one backup data form among the plurality of backup data and to cause the second information processing apparatus to download the import data based on the one backup data associated with the unique identification information of the mobile terminal.

22. A non-transitory computer-readable storage medium that stores a program for causing a programmable mobile terminal, for use in a system that provides import data based on backup data of a first information processing apparatus to a second information processing apparatus via a server configured to manage a plurality of backup data, to execute a method, the mobile terminal comprising a wireless communication interface for performing Near Field Communication, the method comprising:

transmitting, to the first information processing apparatus which to be transmit one backup data of the first information processing apparatus and unique identification information of the mobile terminal through the wireless communication interface to cause the server to specify the one backup data form among the plurality of backup data and, the unique identification information to be associated with the one backup data transmitted from the first information processing apparatus to the server; and transmitting the unique identification information of the mobile terminal to the second information processing apparatus through the wireless communication interface to cause the second information processing apparatus to download the import data based on the one backup data associated with the unique identification information of the mobile terminal.

* * * * *